United States Patent
Vardakostas et al.

(10) Patent No.: US 10,905,150 B2
(45) Date of Patent: *Feb. 2, 2021

(54) SYSTEM FOR DISPENSING TOPPINGS

(71) Applicant: Creator, Inc., San Francisco, CA (US)

(72) Inventors: Alexandros Vardakostas, San Francisco, CA (US); Steven Frehn, San Francisco, CA (US); John Lawrence McDonald, Oakland, CA (US)

(73) Assignee: Creator, Inc., San Francisco, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 16/408,502

(22) Filed: May 10, 2019

(65) Prior Publication Data

US 2019/0261671 A1    Aug. 29, 2019

Related U.S. Application Data

(63) Continuation of application No. 15/082,942, filed on Mar. 28, 2016, now Pat. No. 10,292,415, which is a
(Continued)

(51) Int. Cl.
*A23P 20/20* (2016.01)
*A21C 15/00* (2006.01)

(52) U.S. Cl.
CPC ............ *A23P 20/20* (2016.08); *A21C 15/002* (2013.01)

(58) Field of Classification Search
CPC ..... A21C 15/02; A21C 15/002; A21C 15/007; A21C 9/04; A23G 9/286; A23P 20/20
(Continued)

(56) References Cited

U.S. PATENT DOCUMENTS 3,342,307 A    9/1967 Leach
3,456,578 A    7/1969 William
(Continued)

FOREIGN PATENT DOCUMENTS

CN    107708425 A    2/2018
EP    0296496 A2    12/1988
(Continued)

OTHER PUBLICATIONS

International Search Report and Written Opinion for PCT Application No. PCT/US2019/038335; dated Oct. 4, 2019; 9 pages.
(Continued)

*Primary Examiner* — Phuong T Nguyen
(74) *Attorney, Agent, or Firm* — Harness, Dickey & Pierce, P.L.C.

(57) ABSTRACT

One variation of a method for dispensing toppings onto topping vehicles includes: indexing a first topping vehicle to a first position adjacent a first topping module, the first topping module including a first hopper containing a first topping of a first topping type; indexing a second topping vehicle to a second position adjacent a second topping module including a second hopper containing a second topping of a second topping type; retracting a first blade of the first topping module; advancing the first blade through the first topping; retracting a first retaining plate to dispense a topping slice from the first topping onto the first topping vehicle according to a first topping order for the first topping vehicle specifying the first topping type, the first retaining plate offset from the first blade opposite the first hopper; advancing the first retaining plate; and indexing the first topping vehicle to the second position.

20 Claims, 10 Drawing Sheets

Related U.S. Application Data continuation of application No. 14/534,038, filed on Nov. 5, 2014, now Pat. No. 9,326,544, which is a continuation-in-part of application No. 13/911,637, filed on Jun. 6, 2013, now Pat. No. 9,386,799.

(60) Provisional application No. 61/656,106, filed on Jun. 6, 2012.

(58) Field of Classification Search
USPC ... 99/450.4, 450.5, 325, 326, 357, 334, 352, 99/358, 355, 443 C, 433 R, 494, 451; 426/274, 275, 574, 629, 641, 656, 634, 426/516–519, 531, 802
See application file for complete search history.

(56) References Cited

U.S. PATENT DOCUMENTS

| | | | |
|---|---|---|---|
| 3,774,791 A | 11/1973 | Ulrich | |
| 3,780,643 A | 12/1973 | Papai | |
| 3,887,964 A | 6/1975 | Richards | |
| 4,246,462 A | 1/1981 | Meisel | |
| 4,356,595 A | 11/1982 | Sandberg et al. | |
| 4,513,656 A | 4/1985 | Fay | |
| 4,567,819 A | 2/1986 | Adamson | |
| 4,582,047 A | 4/1986 | Williams | |
| 4,716,821 A | 1/1988 | Mally et al. | |
| 4,723,614 A | 2/1988 | Lahti | |
| 4,913,039 A | 4/1990 | Sutphen | |
| 4,944,218 A | 7/1990 | Cresson | |
| 4,949,629 A | 8/1990 | Leary et al. | |
| 4,951,648 A | 8/1990 | Shukla et al. | |
| 5,033,366 A | 7/1991 | Sullivan | |
| 5,085,138 A | 2/1992 | Fehr et al. | |
| 5,101,715 A | 4/1992 | Liu | |
| 5,113,753 A | 5/1992 | Robinson | |
| 5,113,754 A | 5/1992 | Robinson et al. | |
| 5,115,731 A | 5/1992 | Maitland | |
| 5,184,538 A | 2/1993 | Ledet | |
| 5,190,780 A | 3/1993 | Fehr et al. | |
| 5,306,192 A | 4/1994 | Caveza et al. | |
| 5,365,835 A | 11/1994 | Naramura | |
| 5,377,492 A | 1/1995 | Robertson et al. | |
| 5,379,633 A | 1/1995 | Flisram et al. | |
| 5,441,035 A | 8/1995 | Liang-Chieh | |
| 5,493,958 A | 2/1996 | Naramura | |
| 5,520,520 A | 5/1996 | Nakamoto et al. | |
| 5,540,943 A | 7/1996 | Naramura | |
| 5,546,848 A | 8/1996 | Naramura | |
| 5,549,040 A | 8/1996 | Nararnura | |
| 5,562,183 A | 10/1996 | Naramura | |
| 5,566,817 A | 10/1996 | Meeker | |
| 5,657,685 A | 8/1997 | Garcia Torres | |
| 5,667,685 A | 9/1997 | Yoshida et al. | |
| 5,826,496 A | 10/1998 | Jara | |
| 5,921,096 A | 7/1999 | Warren | |
| 6,032,574 A | 3/2000 | Brayton et al. | |
| 6,095,322 A | 8/2000 | Buysman et al. | |
| 6,323,462 B1 | 11/2001 | Strand | |
| 6,370,513 B1 | 4/2002 | Kolawa et al. | |
| 6,546,847 B2 | 4/2003 | Pilati et al. | |
| 6,696,003 B2 | 2/2004 | Cediel et al. | |
| 6,837,436 B2 | 1/2005 | Swartz et al. | |
| 6,843,166 B1 | 1/2005 | Li | |
| 6,915,734 B2 | 7/2005 | Torghele et al. | |
| 7,063,263 B2 | 6/2006 | Swartz et al. | |
| 7,160,566 B2 | 1/2007 | Fink et al. | |
| 7,216,490 B2 | 5/2007 | Joshi | |
| 7,220,944 B2 | 5/2007 | Miller et al. | |
| 7,370,749 B2 | 5/2008 | Smith | |
| 7,561,834 B2 | 7/2009 | Silence | |
| 7,581,476 B2 | 9/2009 | Freudinger et al. | |
| 7,600,459 B2 | 10/2009 | Bodey et al. | |
| 7,682,227 B1 | 3/2010 | Bifulco | |
| 7,828,237 B2 | 11/2010 | Griffith et al. | |
| 8,011,914 B2 | 9/2011 | Taylor et al. | |
| 8,145,854 B1 | 3/2012 | Lee | |
| 8,190,483 B2 | 5/2012 | Woycik et al. | |
| 8,276,505 B2 | 10/2012 | Buehler | |
| 8,307,951 B2 | 11/2012 | Sus et al. | |
| 8,429,026 B1 | 4/2013 | Kolawa et al. | |
| 9,295,281 B2 | 3/2016 | Vardakostas et al. | |
| 9,295,282 B2 | 3/2016 | Vardakostas et al. | |
| 9,326,544 B2 | 5/2016 | Vardakostas et al. | |
| 9,386,799 B2 | 7/2016 | Vardakostas et al. | |
| 2003/0200848 A1 | 10/2003 | Kuchler | |
| 2004/0045975 A1 | 3/2004 | Leykin et al. | |
| 2004/0208961 A1 | 10/2004 | Reckert et al. | |
| 2005/0034588 A1 | 2/2005 | Schone et al. | |
| 2005/0051566 A1 | 3/2005 | Leykin et al. | |
| 2005/0199135 A1 | 9/2005 | Nishinomiya et al. | |
| 2005/0279228 A1 | 12/2005 | Julian et al. | |
| 2006/0237477 A1 | 10/2006 | Gregg | |
| 2007/0023505 A1 | 2/2007 | Norton et al. | |
| 2007/0196540 A1 | 8/2007 | Kirksey et al. | |
| 2007/0265935 A1 | 11/2007 | Woycik et al. | |
| 2008/0187637 A1 | 8/2008 | Spiegel | |
| 2008/0313046 A1 | 12/2008 | Denenburg et al. | |
| 2009/0056562 A1* | 3/2009 | Julian | B26D 7/0641 99/538 |
| 2009/0241481 A1 | 10/2009 | Sus et al. | |
| 2011/0232440 A1 | 9/2011 | Weber | |
| 2011/0256292 A1 | 10/2011 | Purgatorio et al. | |
| 2012/0072311 A1 | 3/2012 | Khan | |
| 2012/0078734 A1 | 3/2012 | Sus et al. | |
| 2012/0179584 A1 | 7/2012 | Woycik et al. | |
| 2013/0020330 A1 | 1/2013 | Luft et al. | |
| 2016/0165948 A1 | 6/2016 | Vardakostas et al. | |
| 2016/0213054 A1 | 7/2016 | Vardakostas et al. | |
| 2018/0020716 A1 | 1/2018 | Vardakostas et al. | |

FOREIGN PATENT DOCUMENTS

| | | |
|---|---|---|
| JP | H0191739 A | 4/1989 |
| JP | H06007127 A | 1/1994 |
| JP | H07215471 A | 8/1995 |
| JP | H07215472 A | 8/1995 |
| JP | H07227195 A | 8/1995 |
| JP | H07227196 A | 8/1995 |
| JP | H07227197 A | 8/1995 |
| JP | H07227198 A | 8/1995 |
| JP | H07227199 A | 8/1995 |
| JP | H07232807 A | 9/1995 |
| JP | H07255604 A | 10/1995 |
| JP | H07313373 A | 12/1995 |
| JP | H0871003 A | 3/1996 |
| JP | 2001-505064 A | 4/2001 |
| JP | 3178899 B2 | 6/2001 |
| JP | 2002233340 A | 8/2002 |
| JP | 2004001210 A | 1/2004 |
| JP | 2009269159 A | 11/2009 |
| WO | WO-8908983 A1 | 10/1989 |
| WO | WO-199905093 A1 | 2/1999 |
| WO | WO-1999008537 A1 | 2/1999 |
| WO | WO-1999049277 | 9/1999 |

OTHER PUBLICATIONS

Office Action for CN Application No. 2017101652805; dated Dec. 19, 2019; 10 pages.
U.S. Appl. No. 16/699,559, filed Nov. 30, 2019, Joanna Cohen.
Supplementary European Search Report for EP Application No. 13800076.5, dated Apr. 7, 2016.
International Search Report and Written Opinion for PCT Application No. PCT/US13/44499, dated Nov. 8, 2013.
International Preliminary Report on Patentability for PCT Application No. PCT/US2013/044499, dated Dec. 9, 2014.
Office Action for CN Application No. 2013800415573, dated Dec. 9, 2015, 6 pages.
Office Action for CN Application No. 2013800415573, dated Jul. 29, 2016, 6 pages.
Notice of Rejection for JP Application No. 2015-516208, dated Aug. 30, 2016, 3 pages.

(56) References Cited

OTHER PUBLICATIONS

Notice of Rejection for JP Application No. 2015-516208, dated Jan. 26, 2016, 7 pages.
Article 94(3) Communication for EP Application No. 13800076.5 dated Jun. 21, 2017, 6 pages.
Extended European Search Report for EP Application No, 19156696.7, dated Apr. 17, 2019, 8 pages.

* cited by examiner

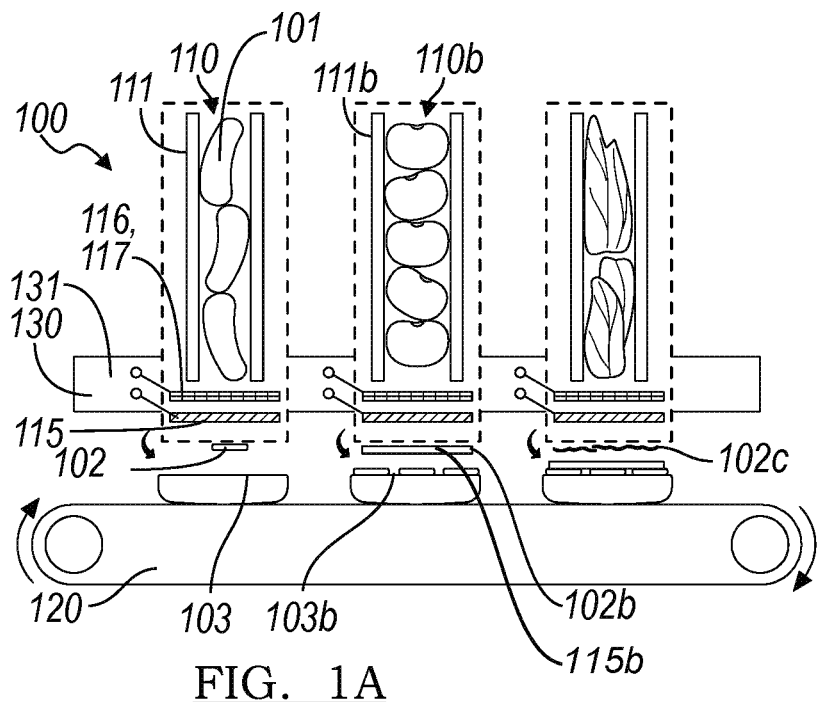
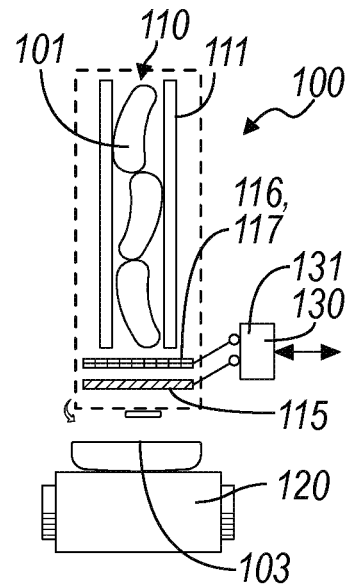
FIG. 1A
FIG. 1B
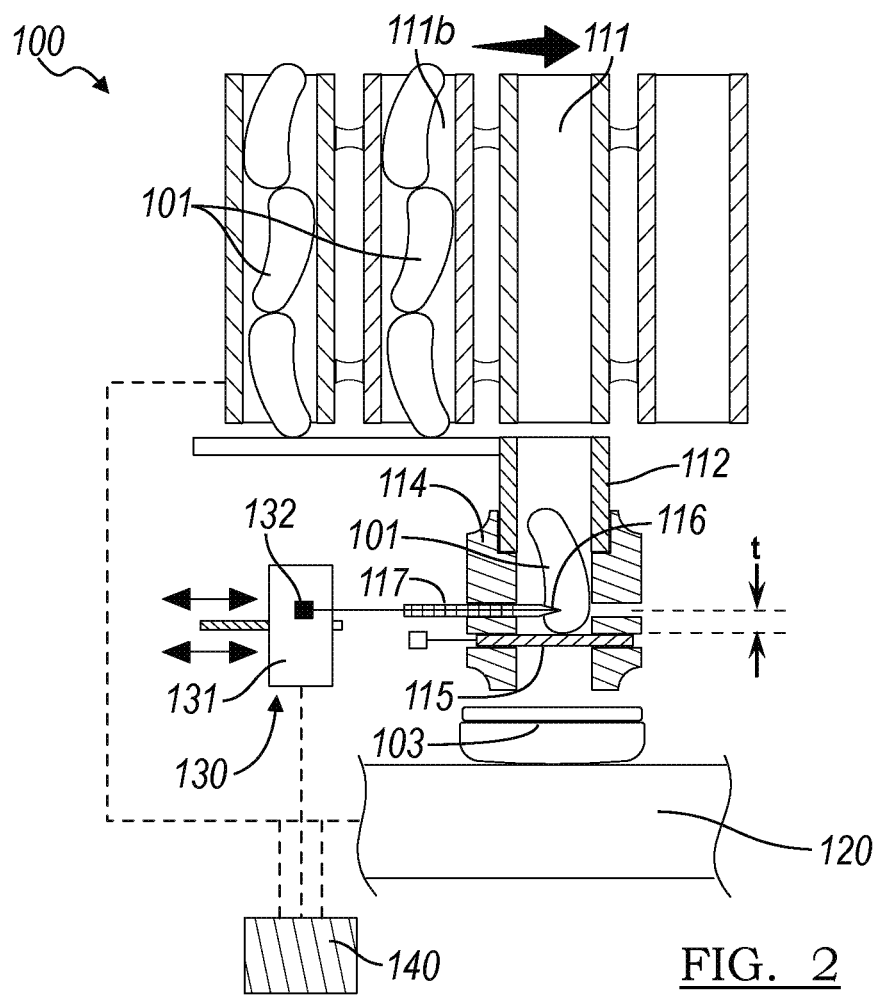
FIG. 2

SYSTEM FOR DISPENSING TOPPINGS

CROSS-REFERENCE TO RELATED APPLICATIONS

This application is a continuation of U.S. patent application Ser. No. 15/082,942 (now U.S. Pat. No. 10,292,415), filed Mar. 28, 2016, which is a continuation of U.S. patent application Ser. No. 14/534,038 (now U.S. Pat. No. 9,326,544), filed Nov. 5, 2014, which is a continuation-in-part of U.S. patent application Ser. No. 13/911,637 (now U.S. Pat. No. 9,386,799), filed Jun. 6, 2013, which claims the benefit of U.S. Provisional Application No. 61/656,106, filed Jun. 6, 2012. The entire disclosures of the above applications are incorporated by reference.

TECHNICAL FIELD

This invention relates generally to the field of food preparation, and more specifically to a new and useful system and method for dispensing toppings in the field of food preparation.

BACKGROUND

Millions of hamburgers and sandwiches are assembled and delivered to patrons at the thousands of restaurant and fast-food locations throughout the United States. Patrons expect custom condiments and toppings, which conventionally necessitates human input to build a custom hamburger or sandwich. Thus, hamburger and sandwich assembly is typically labor-intensive and can leave room for mishandled food and incorrect or incomplete food orders.

BRIEF DESCRIPTION OF THE DRAWINGS

FIG. 1A is a schematic representation of a system;
FIG. 1B is a schematic representation of a system;
FIG. 2 is a schematic representation of a variation of the system.

DETAILED OF THE EMBODIMENTS

Figure 3:
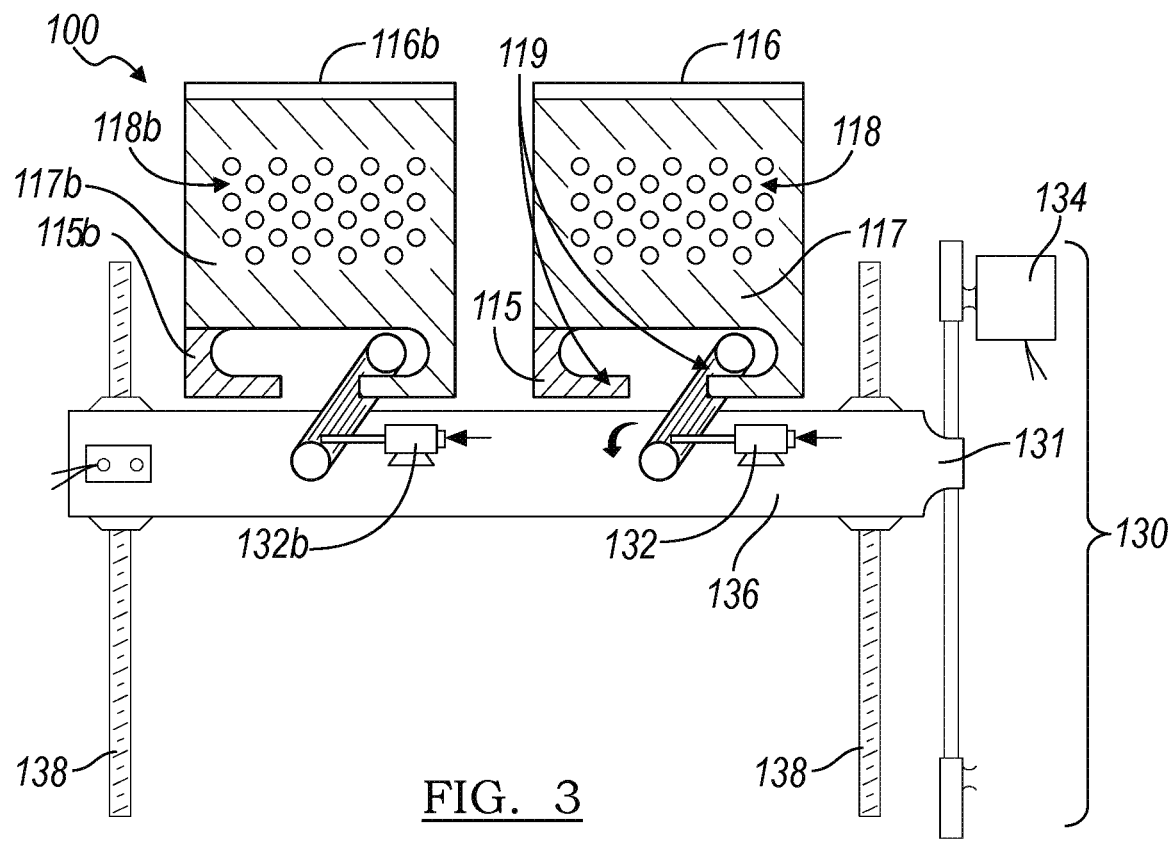
FIG. 3 is a schematic representation of a variation of the system.

The following description of the embodiment of the invention is not intended to limit the invention to these embodiments, but rather to enable any person skilled in the art to make and use this invention.

1. System

As shown in FIGS. 1A and 1B, a system 100 for dispensing toppings onto a topping vehicle includes: a first topping module 110 including a first hopper 111 configured to dispense a first topping of a first topping type, a first blade 116 adjacent a discharge end of the first hopper 111 and configured to slice a topping serving from the first topping, and a first retaining plate 115 offset from and adjacent the first blade 116 opposite the first hopper 111; second topping module 110b including a second hopper 111b configured to dispense a second topping of a second topping type, a second blade 116b adjacent a discharge end of the second hopper 111b and configured to slice a topping serving from the second topping, and a second retaining plate 115b offset from and adjacent the second blade 116b opposite the second hopper 111b; a conveyor 120 configured to advance the topping vehicle from a first position adjacent the first topping module 110 to a second position adjacent the second topping module 110b; and a carriage 130 configured to retract and advance the first blade 116 and the first retaining plate 115 to dispense a topping serving from the first topping onto the topping vehicle in the first position and to retract and advance the second blade 116b and the second retaining plate 115b to dispense a topping serving from the second topping onto the topping vehicle in the second position.

As shown in FIG. 1, one variation of the system includes: a receiver 160; a blade 116 supported by the receiver 160; a magazine of hoppers 170 configured to contain topping samples of a first topping type, hoppers in the magazine of hoppers 170 selectively indexed over the receiver 160 to dispense topping samples of the first type into the receiver 160; a retaining plate 115 adjacent and offset from the blade 116 opposite the magazine of hoppers 170; a conveyor 120 sequentially advancing a first topping vehicle from an initial position to a dispense position adjacent the receiver 160 and advancing a second topping vehicle, in series behind the first topping vehicle, from the initial position to the dispense position; and an actuator 134 selectively advancing and retracting the blade 116 and the retaining plate relative to the receiver 160 to dispense a serving of the first topping type from the receiver 160 onto the first topping vehicle in the dispense position, at a first time, based on a first food order corresponding to the first topping vehicle, and the actuator selectively advancing and retracting the blade 116 and the retaining plate relative to the receiver 160 to dispense a serving of the first topping type from the receiver 160 onto the second topping vehicle in the dispense position, at a second time succeeding the first time, based on a second food order corresponding to the second topping vehicle, the second food order distinct from the first food order.

Figure 12:
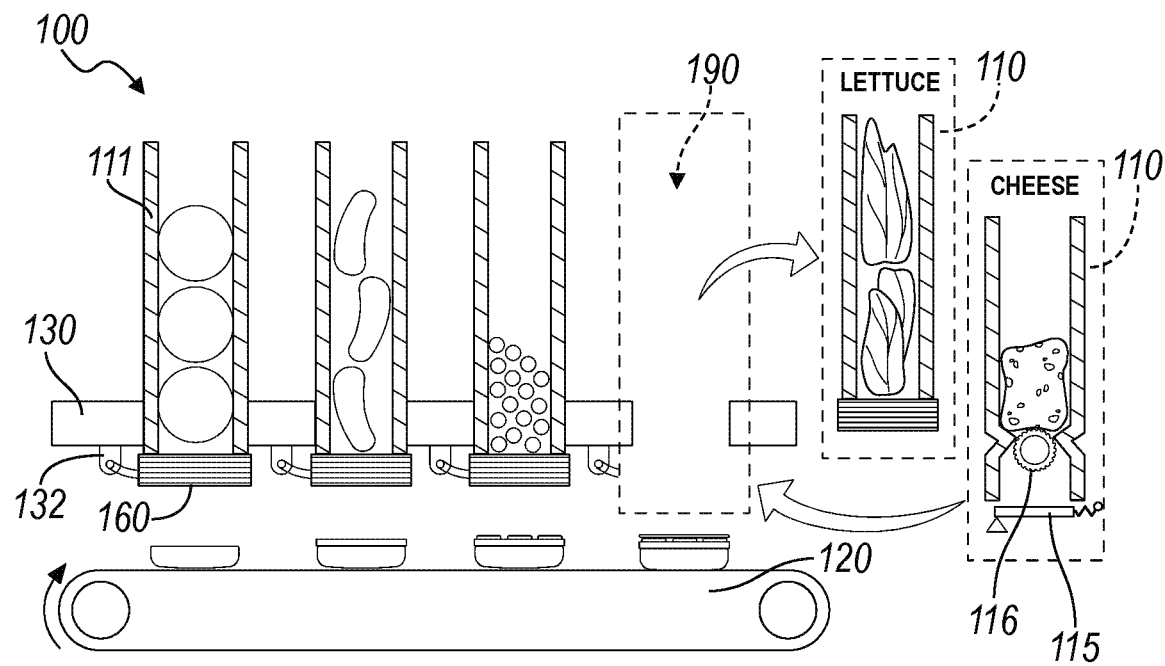
FIG. 12 is a schematic representation of one variation of the system.

As shown in FIGS. 1 and 12, another variation of the system includes: a first topping module receptacle 190 including a first blade 116; a second topping module receptacle adjacent the first topping module and including a second blade; a conveyor sequentially advancing topping vehicles from an initial position to a first dispense position adjacent the first topping module receptacle 190 and from the first dispense position to a second dispense position adjacent the second topping module receptacle; a first set of topping modules corresponding to a first menu item and including a first topping module and a second topping module, the first topping module including a first hopper transiently engaging the first topping module receptacle 190 to dispense topping samples of a first topping type of the first menu item into the first topping module receptacle 190, and the second topping module including a second hopper transiently engaging the second topping module receptacle to dispense topping samples of a second topping type of the first menu item into the second topping module receptacle; a second set of topping modules corresponding to a second menu item and including a third topping module and a fourth topping module, the third topping module including a third hopper transiently engaging the first topping module receptacle 190 to dispense topping samples of a third topping type of the second menu item into the first topping module receptacle 190, and the fourth topping module including a fourth hopper transiently engaging the second topping module receptacle to dispense topping samples of a fourth topping type of the second menu item into the second topping module receptacle, the second menu item distinct from the first menu item; and an actuator system 180 selectively advancing and retracting the first blade 116 to dispense a serving of a topping sample from the first topping module onto a topping vehicle in the first dispense position and selectively advancing and retracting the second blade to dispense a serving of a topping sample from the second topping module onto the topping vehicle in the second dispense position based on a food order corresponding to the topping vehicle.

Figure 13A:
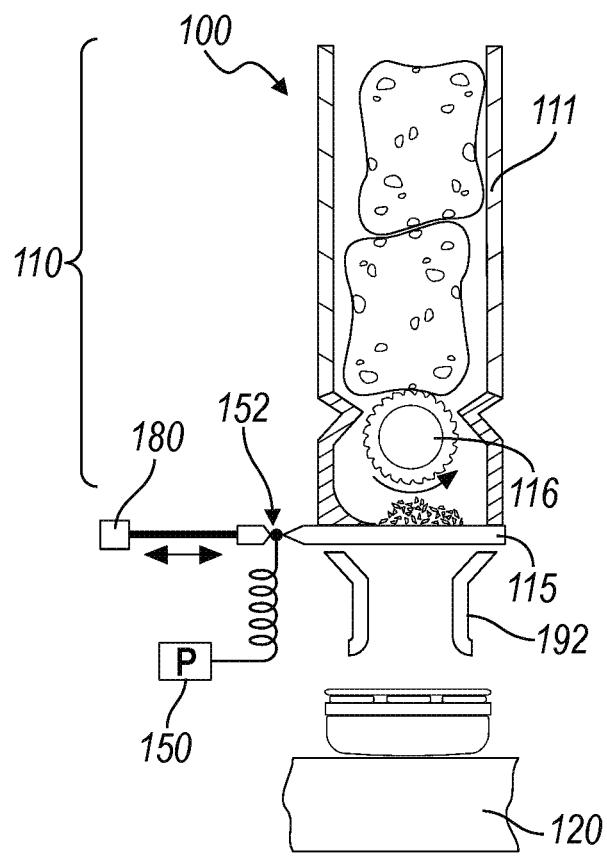
FIGS. 13A and 13B are schematic representations of one variation of the system.
Figure 13B:
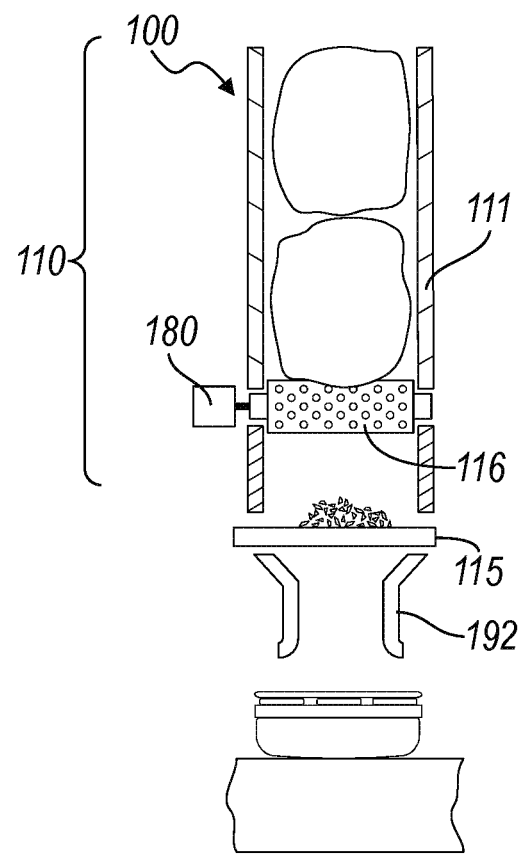

As shown in FIGS. 1, 13A, and 13B, yet another variation of the system includes: a topping module including: [a hopper configured to contain topping samples of a first topping type; a blade 116 adjacent a discharge end of the hopper and configured to cut portions from topping samples of the first topping type dispensed from the hopper; a retaining plate adjacent and offset from the blade 116 and collecting portions of the topping type from the blade 116; and a scale coupled to the retaining plate and outputting a signal corresponding to a quantity of portions of the topping type collected on the retaining plate;] a conveyor advancing a first topping vehicle from an initial position to a dispense position adjacent the topping module and advancing a second topping vehicle, in series behind the first topping vehicle, from the initial position to the dispense position; and an actuator system 180 selectively actuating the blade 116 and the retaining plate to dispense a first serving of the first topping type from the topping module onto the first topping vehicle in the first dispense position based on a request for the first topping type specified in a first food order corresponding to the first topping vehicle and based on an output of the scale, and the actuator system 180 selectively actuating the blade 116 and the retaining plate to dispense a second serving of the first topping type from the topping module onto the second topping vehicle in the first dispense position based on a request for the first topping type specified in a second food order corresponding to the second topping vehicle and based on an output of the scale, the first food order distinct from the second food order.

1.1 Applications

The system 100 generally functions to slice fresh toppings and to selectively dispense topping servings (i.e., topping servings) onto edible topping vehicles according to topping orders specific to each topping vehicle. The system 100 can therefore automate fulfillment of custom topping orders specifying any combination of available toppings loaded into two or more topping modules by advancing edible topping vehicles through the topping modules and selectively slicing and dispensing topping servings from each topping module. In one example, the system 100 can selectively and sequentially dispense servings of lettuce, tomato, onion, and pickle from the lettuce, tomato, onion, and pickle topping modules, respectively, onto a stream of hamburger buns (i.e., edible topping vehicles) according to custom topping orders submitted by each patron in a restaurant. In this example, the system 100 can receive a first custom topping order from a first patron and a second custom topping order from a second patron, assign the first custom topping order (and/or a hamburger patty, a custom topping or sauce order, etc.) to a first hamburger bun (e.g., a bun heel or bun crown) and the second custom topping order to a second hamburger bun, index the first and second (adjacent) hamburger buns through the topping modules, selectively dispense topping servings onto the first hamburger bun according to the first custom topping order, and selectively dispense topping servings onto the second hamburger bun according to the second custom topping order. Each topping module can define a 'stage' in a serial set of stages, and the system 100 can thus enable substantially simultaneous assembly of multiple topping orders at various stages of build as multiple topping vehicles are advanced through the topping modules.

Topping modules within the system 100 can be arranged substantially vertically over the conveyor 120 such that toppings within each topping module gravity feed into each slicing mechanism and thus onto topping vehicles supported by the conveyor 120 below. The conveyor 120 can index multiple topping vehicles though the topping modules simultaneously, as shown in FIG. 1A. In one example, the conveyor 120 aligns a first topping vehicle adjacent a first topping module, the first topping module dispenses a first topping serving onto the first topping vehicle, the conveyor 120 indexes the first topping vehicle into alignment with the second topping module, and the second topping module dispenses a second topping serving onto the first topping vehicle. In this example, the conveyor 120 can align a second topping vehicle—adjacent and succeeding the first topping vehicle—with the first topping module, and the first topping module can dispense a third topping serving onto the second topping vehicle. The system 100 can thus implement topping orders to control dispensation of topping servings from each topping module onto each topping vehicle while multiple topping vehicles move through the various topping modules, wherein each topping order defines which toppings to dispense (and which not to dispense) onto an associated topping vehicle.

In this document, 'topping' and 'topping sample' refer to any sliceable topping and/or add-on for a sandwich, a hamburger, hot dog, a wrap, a taco, a burrito, a salad, a crepe, a bowl of soup, an omelet, or any other foodstuff. For example, the system 100 can include six topping modules, wherein each topping module dispenses a different topping, such as lettuce, tomato, onion, pickle, hard-boiled egg, or avocado. Therefore, the topping vehicle can include any of a bun, a slice of bread, a tortilla, a taco, a bed of lettuce, soup within a soup container, a crepe, and omelet, etc. The system 100 can additionally or alternatively dispense condiments, such as relish, ketchup, mustard barbecue sauce, salsa, hot sauce, etc.

The system 100 can be a subsystem within an automated foodstuff assembly system including one or more other subsystems to prepare, assemble, and deliver other components of a foodstuff. For example, the automated foodstuff assembly system can include a patty grinding subsystem that grinds and presses custom hamburger patties from raw meat (e.g., based on custom patty orders), a patty grilling subsystem that grills patties (e.g., rare, medium, or well-done based on custom patty orders), a bun toaster subsystem that toasts each halve of a hamburger bun, the system 100 that loads toppings onto bottom buns (e.g., based on custom topping orders), and a bagging subsystem that loads completed hamburgers into paper bags for delivery to patrons. The system 100 can similarly assembly sandwiches, hotdogs, burritos, tacos, wraps, salads, beverages (e.g., smoothies, coffee drinks), or other foodstuffs, such as according to custom food orders. The system 100 can therefore be incorporated into an automated foodstuff assembly to enable food order customization by selectively dispensing toppings according to topping orders specific to particular topping vehicles. However, the system 100 can be a standalone device, incorporated into any other device or system, or implemented in any other way.

1.2 Topping Modules

As shown in FIGS. 1A and 2, the first topping module 110 of the system 100 includes a first hopper 111, a first blade 116, and a first retaining plate 115. The first hopper 111 is configured to dispense a first topping 101 of a first topping type, the first blade 116 is adjacent a discharge end of the first hopper 111 and is configured to slice a topping serving 102 from the first topping, and the first retaining plate 115 is offset from and adjacent the first blade 116 opposite the first hopper 111. Similarly, the second topping module 110b of the system 100 includes a second hopper 111b, a second blade 116b, and a second retaining plate 115b. The second hopper 111b is configured to dispense a second topping 101b of a second topping type, the second blade 116b is adjacent a discharge end of the second hopper 111b and is configured to slice a topping serving 102b from the second topping, and the second retaining plate 115b is offset from and adjacent the second blade 116b opposite the second hopper 111b.

The system 100 can include any number of topping modules, and each topping module can be configured to dispense one particular type of topping, such as lettuce, tomato, pickle, onion, mushrooms, bacon, cheese, hard-boiled egg, carrots, pineapple, peppers, scallions, cucumbers, sprouts, avocado, onion rings, French fries, a second halve of a bun (e.g., a bun heel), a deli meat, a cooked or prepared meat, a hotdog, a sausage, or a hamburger patty, etc. Each topping module within the system 100 can include a hopper configured to dispense a topping of a particular topping type, a blade arranged adjacent a discharge end of the hopper and configured to slice a topping serving from the topping, and a retaining plate offset from and adjacent the blade opposite the hopper, wherein the retaining plate is configured to retain the topping prior to slicing and to release a topping serving once sliced by the blade. A blade and retaining plate pair within one topping module can therefore define a cutting mechanism.

Generally, each topping module can be configured to slice a topping serving from a fresh and/or relatively whole topping sample of a particular topping type. In one example, the first topping module is configured to dispense pickles. The first hopper 111 can thus define a geometry that accepts common pickle shapes (e.g., of a particular pickle variety and/or from a particular distributor), and the first hopper 111 can feed whole pickles into the first blade 116 (e.g., via gravity), the retaining plate can support a (whole) topping vertically within the receiver 160, and the carriage or the actuator can advance (or retract) the blade to slice a pickle serving from the pickle sample. The carriage 130 can subsequently retract the retaining plate to dispense the pickle slice onto the topping vehicle. In this example, the second topping module can succeed (i.e., follow) the first topping module 110 and can be configured to dispense tomatoes, wherein the first hopper 111 feeds whole ripe tomatoes into the blade and the carriage 130 sequentially actuates the blade and the retaining plate to slice and then deposit a tomatoes serving onto the topping vehicle.

A hopper within a topping module can be arranged over a corresponding blade such that toppings may be gravity-fed through the hopper and into the blade. Alternatively, a hopper within a topping module can be angularly offset from vertical, and toppings can be additionally or alternatively actively fed through each hopper, such as with a lead screw arranged within the hopper can configured to displace toppings into corresponding blade.

A hopper of a particular topping module can define a cross-section of a size and/or geometry suitable for a topping type corresponding to the particular topping module. In one example, for the topping module corresponding to whole dill pickles, the hopper can be circular in cross-section with a 3" internal diameter, which can accommodate curved dill pickles with 1.5" to 2.5" outer diameters (though the hopper can have internal diameter of any other size to accommodate dill pickles of any other outer diameters). In this example, the topping module corresponding to whole dill pickles can include a set of hoppers, such as three hoppers of similar or substantially identical cross-section, each configured to dispense a dill pickles, wherein the carriage 130 can actuate the corresponding blade to slice a pickle serving from pickles in each of the set of hoppers in a single stroke. In another example, for the topping module corresponding to a hard cheese, the hopper can define a rectilinear cross-section of internal dimension accommodating a 0.2" gap on all sides of a standard cheese block fed through the hopper.

As described above, a topping module can include a set of adjacent hoppers. In this implementation, each hopper in the set of hoppers for the topping module can dispense the same type of topping. For example, the first topping module 110 can include three hoppers arranged concentrically (e.g., in a triangular pattern) about an axis parallel to the axes of the hoppers, and each of the three hoppers can dispense pickles. Alternatively, each hopper in the set of hoppers within the topping module can include a different topping type, such as commonly-paired toppings. For example, the first topping module 110 can include two parallel and adjacent hoppers, including one hopper configured to dispense pickled jalapenos and another hopper configured to dispense pickles carrots. In a similarly example, the first topping module 110 can include two parallel and adjacent hoppers, including one hopper configured to dispense cilantro and another hopper configured to dispense onion. In this implementation, carriage 130 can actuate the blade of the topping module to slice a topping serving from topping from each hopper in the topping module in the same cut stroke.

Figure 7:
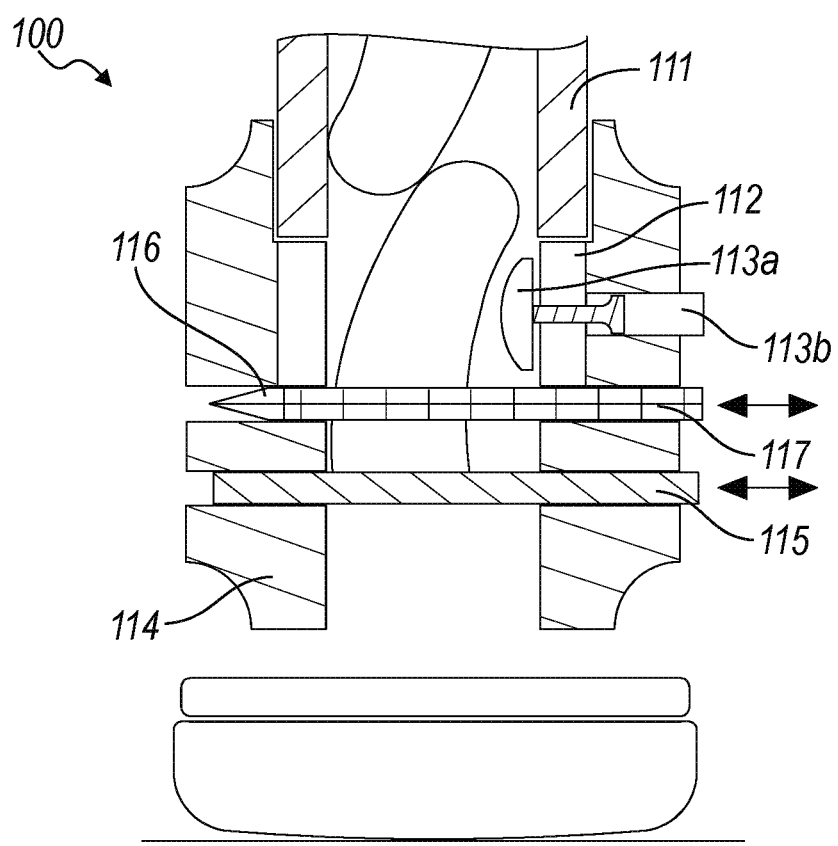
FIG. 7 is a schematic representation of one variation of the system.

The geometry and/or cross-section of a hopper within a topping module can be static. Alternatively, the effective internal diameter and/or internal geometry of a hopper can be adjustable. For example, a topping module can include a topping guide 113a (shown in FIG. 7) mounted within a corresponding hopper via a pivot and/or an adjustment screw proximal a discharge (i.e., output) end of the hopper. In this example, an operator can adjust the adjustment screw to advance or retract the topping guide 113a, thereby modifying an effect internal dimension of the corresponding hopper to a substantially optimal position for constraining a corresponding topping type. In another example, the topping guide 113a can be mounted within the hopper via a pivot and a chute actuator 113b (e.g., a solenoid, a rotary electric motor), as shown in FIG. 7, wherein the position of the chute actuator 113*b* is dynamically controlled to optimize the position of the topping guide 113*a* to constrain the specified topping for slicing. In this example, the chute actuator 113*b* can be controlled by a processor 150 that implements closed-loop feedback to maintain a near-constant application of cross-axial force on toppings as the toppings are fed through the hopper. In this example, the processor can interface with an optical sensor (e.g., a camera) adjacent the hopper and can implement machine vision to identify variations in size of toppings within the hopper and adjust the topping guide 113*a* accordingly. Alternatively, the processor can interface with a pressure sensor, a strain gauge, an ammeter, or any other suitable sensor to calculate a suitable force to apply to a topping within the hopper via the topping guide 113*a* and/or to calculate a suitable position for the topping guide 113*a*. In this example, the processor can also dynamically adjust the position of the topping guide 113*a* to manipulate a topping into slicing position within a corresponding slicing mechanism. However, each hopper can define any other geometry, cross-section, or dimension, can include any other active components, and/or can be adjusted or controlled in any other way.

As shown in FIGS. 1A and 2, a blade in a corresponding topping module is configured to slice a topping serving from a topping sample fed into the cutting mechanism from an adjacent corresponding hopper. The blade can be a disposable blade configured to mount to a cutting plate 117, wherein the blade defines a leading edge of the retaining plate 117. Alternatively, the blade and the retaining plate 117 can define a unitary structure. The carriage 130 can select and retract the retaining plate 117 (and thus the blade) to release the topping sample into a cutting chamber between the retaining plate 117 and a corresponding retaining plate, and the carriage 130 can subsequently advance the retaining plate 117 into the cutting chamber to slice a serving from the topping sample.

Figure 9A:
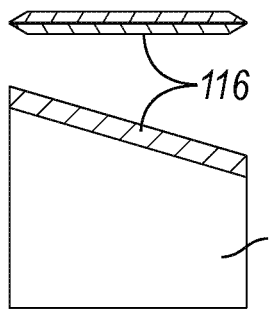
FIGS. 9A-9E are schematic representations of variations of cutting plates and blades of the system.
Figure 9B:
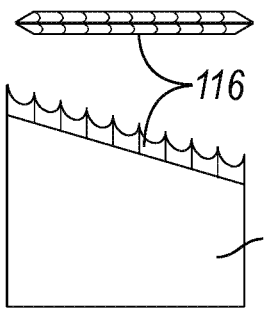
Figure 9C:
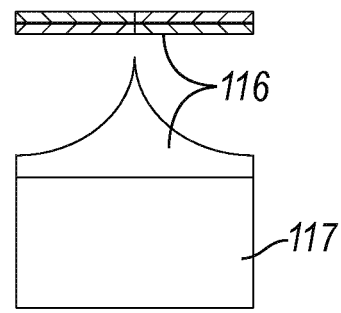
Figure 9D:
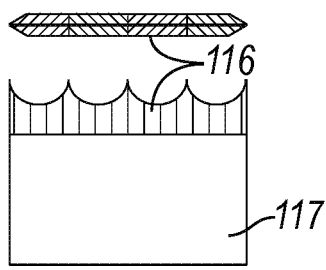

In one example implementation shown in FIG. 9A, the blade includes a straight blade defining a straight cutting edge. Alternatively, the blade can include a serrated (shown in FIG. 9B), waveform (shown in FIG. 9D), or other cutting edge geometry along a leading edge of the blade. The blade can also include a combination of cutting edge geometries. For example, the cutting edge of a blade corresponding to a topping module configured to dispense tomato servings can define an acute angle with the direction of linear motion (i.e., advancement and retraction) of the blade, and a leading portion of the blade can be serrated to pierce the endocarp of a tomato sample, and the remainder of the blade can be straight to cleanly cut the remainder of the tomato sample. The leading edge of the blade can be linear, curvilinear, or of any other form or geometry. Alternatively, the blade can include multiple leading edges, such as a V-blade (shown in FIG. 9C) and/or any other suitable form.

Figure 9E:
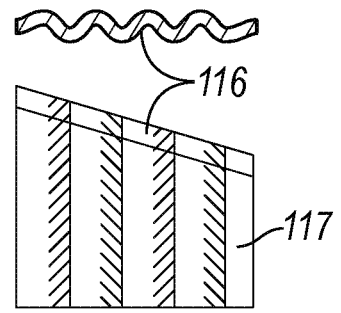

The blade can be substantially planar along the cutting edge, as shown in FIG. 9A. Alternatively, the blade can be non-planar along the cutting edge. For example, a topping module configured to dispense pickle servings can include a blade that defines a 'wave' form along the cutting edge and thus yield 'wavy' pickles, as shown in FIG. 9E. The cutting plate 117 can ride (e.g., as a running fit) within a blade guide 114 of a geometry similar to that of the first blade 116, as shown in FIGS. 2 and 7. As in the foregoing example, the cutting mechanism can include a blade guide defining a form that substantially matches the wave form of the cutting plate. The geometry of the blade guide 114 can thus provide support to the retaining plate 117 throughout its throw and can prevent topping servings and/or topping debris from drawing between the blade and the blade guide. However, the blade, retaining plate 117, and/or blade guide can be of any other suitable shape, profile, or geometry.

Figure 4:
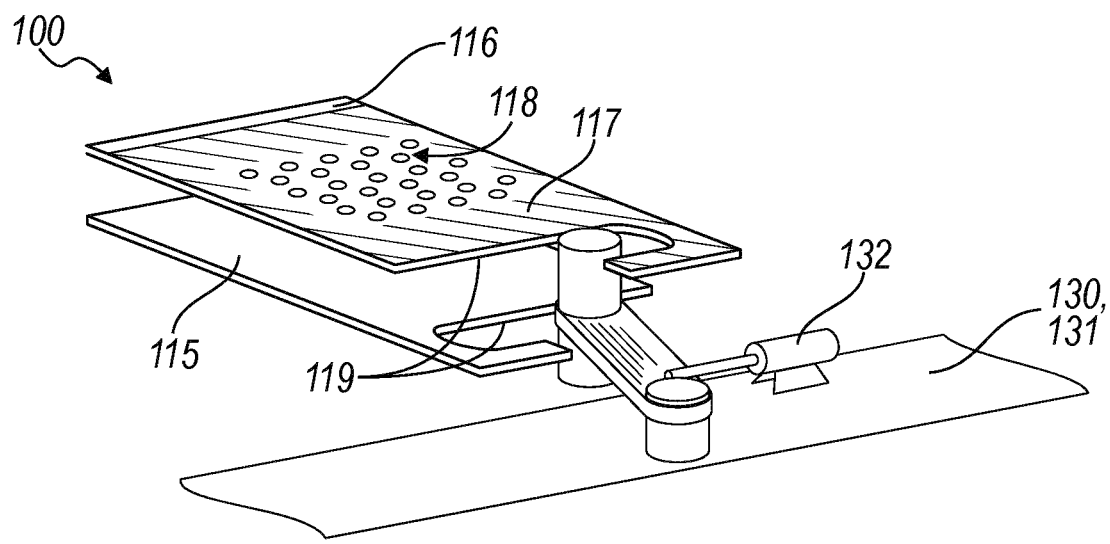
FIG. 4 is a schematic representation of a variation of the system.

As shown in FIGS. 3 and 4, a broad face of the retaining plate 117 can further define a perforated (e.g., low-surface-area) region 118 behind the blade. The perforated region 118 can be configured to contact the topping sample within the cutting mechanism when the blade is substantially fully advanced though the topping sample. In one implementation, the perforated portion includes a screen of woven material defining a set of opens arranged on the retaining plate 117, such as over an opening in the retaining plate 117 behind the blade. In another implementation, the perforated region 118 includes a set of bores (i.e., perforations) directly in the retaining plate 117, such as a set of drilled, etched, machined, laser-cut, waterjet-cut, die-cut, stamped, or cast through-bores formed into the retaining plate 117 behind the blade. In alternative implementations, the perforated region 118 includes any of a set of wrinkles, stamped divots, or formed troughs and valleys in the retaining plate 117 behind the blade. However, the perforated region 118 can be of any other suitable geometry to reduce or minimize surface area contact between a serving cut from a corresponding topping and the retaining plate 117 in a fully-advanced position. The perforated region 118 of the cutting plate 117 can therefore function to reduce surface adhesion, suction, hydrogen bonding, or other intermolecular adhesive forces between the retaining plate 117 and a topping serving, which can substantially reduce a likelihood that a topping serving will cling to the retaining plate 117 (after the retaining plate is retracted) rather than dropping onto a corresponding topping vehicle.

As shown in FIG. 2, a retaining plate 117 can include a guide feature configured to engage a cutting guide, as described above, and the guide feature and the cutting guide can thus cooperate to constrain the retaining plate 117 throughout its travel. For example, the guide feature and the cutting guide can cooperate to constrain the retaining plate 117 in five degrees of freedom excluding a linear translation degree of freedom to enable the retaining plate 117 to advance and retract. A retaining plate can similarly include a guide feature configured to engage a retaining guide, as described above, and the guide feature and the retaining guide can thus cooperate to constrain the retaining plate 117 throughout its travel.

A blade (and retaining plate 117), a retaining plate, a cutting guide, and a retaining plate can define a cutting mechanism within a particular topping module. A corresponding chute 112 (described above) can seat in or otherwise engage the cutting guide to feed a topping sample from a corresponding hopper into the cutting chamber, and the retaining guide can physically coextensive with, assembled with, or otherwise coupled to the cutting guide opposite the hopper. The cutting guide and the retaining guide can also be disassemblable to enable blade replacement and/or cleaning of the cutting mechanism.

The cutting guide and/or the retaining guide can be of a food-safe polymer (e.g., PET or HDPE), to limit a need for lubricants and/or to limit wear between the cutting guide and the retaining plate 117 and between the retaining guide and the retaining plate during operation. However, the blade, the retaining plate 117, the retaining plate, the cutting guide, and/or the retaining guide, etc. of a topping module can be of any other suitable material, geometry, form, manufacture, construction etc.

A retaining plate in a topping module can be arranged adjacent and offset from a retaining plate 117 opposite a hopper (or a hopper magazine 170) of a corresponding topping module. Alternatively, a retaining plate in a topping module receptacle 190 can be arranged adjacent and offset from a blade (or retaining plate 117) of the topping module receptacle 190 between the blade and the conveyor. A retaining plate can be configured to retract, relative to the blade, to release a fresh topping serving onto an adjacent topping vehicle (e.g., a toping vehicle in a corresponding dispense position), and the retaining plate can be configured to advance (with or relative to the blade) to retain the sample topping within the cutting mechanism for a subsequent cut. As shown in FIG. 2, the retaining plate can be offset from the corresponding blade (or retaining plate 117) by a distance corresponding to a desired or target thickness of a topping serving of a topping type dispensed from the corresponding topping module.

In one implementation, the offset between a retaining plate and a corresponding blade can be static. Offsets between retaining plates and corresponding blades can also vary across topping modules within the system 100. For example, the offset between a first blade 116 and a first retaining plate 115 corresponding to a first topping module 110 configured to dispense pickle servings can be approximately 0.2" (or between 0.15" and 0.35"), the offset between a second blade 116b and a second retaining plate 115b corresponding to a second topping module 110b configured to dispense tomato servings can be approximately 0.35" (or between 0.3" and 0.4"), and the offset between a second third blade and a third retaining plate corresponding to a third topping module configured to dispense onion servings can be approximately 0.15" (or between 0.1" and 0.2"). In this example, the system 100 can thus yield pickle slices that are thinner than tomato slices and onion slices that are thinner than pickle slices. However, the system 100 can produce topping slices of any other similar, dissimilar, and/or varying thicknesses.

Alternatively, the offset between a retaining plate and a corresponding blade can be adjustable or customizable by an operator. In one example, the cutting mechanism includes a blade guide that supports the retaining plate 117 and a retaining guide that supports the retaining plate, and the blade guide is assembled over the retaining guide with one spacer from a set of spacers of different thicknesses and/or with one or more spacers of the same or dissimilar thicknesses. In this example, an operator (or restaurant, franchise, etc.) can set a preferred thickness for each topping type by adjusting spacers within each cutting mechanism. In another example, the cutting mechanism includes a blade guide that supports the retaining plate 117 and a retaining guide that supports the retaining plate, and the blade guide is assembled over the retaining guide with one or more turnbuckles. In this example, an operator can set a preferred thickness for each topping type by adjusting the turnbuckle(s). A restaurant, franchise, etc. implementing the system 100 to assemble foodstuffs can thus differentiate itself from others that also implement the system 100 to assemble (similar) foodstuffs by customizing serving thicknesses for various toppings.

In yet another implementation, the offset between a retaining plate and a corresponding blade can be adjustable substantially in real time, such as based on a topping order corresponding to a topping vehicle adjacent a corresponding topping module. In this implementation, the topping module can adjust the offset between retaining plate and a corresponding blade substantially in real time to enable custom topping serving thicknesses on a per-topping order basis. In one example, the cutting mechanism includes rectilinear a blade guide that supports the retaining plate 117 and a rectilinear retaining guide that supports the retaining plate, and the blade guide can be coupled to the retaining guide via a set of turnbuckles at each corner of the guides. In this example, each turnbuckle can include a pulley, and the turnbuckles can be linked together via a timing belt operated by a rotary motor. In this example, the processor can implement a topping serving thickness specified in a topping order to control the rotary motor, thereby positing the blade guide and the retaining guide at a separation corresponding to the specified topping serving thickness. In a similar example, the blade guide (or the retaining guide) can substantially rigidly mounted, the retaining guide (or the blade guide) can be supported at each corner by a lead screw, each lead screw can include a pulley, and the lead screws can be linked together via a timing belt operated by a rotary motor. In this similar example, the processor can again implement a topping serving thickness specified in a topping order to control the rotary motor, thereby positing the retaining guide (or the blade guide) to achieve the specified topping serving thickness. In yet another example, the retaining guide is mounted below the cutting guide via a (kinematic) sliding mechanism, and the carriage 130 includes a ramp or actuator adjacent a plate selector, wherein the processor controls the ramp of the actuator as the carriage 130 advances into the topping module to modify the offset between the retaining plate and the corresponding blade.

The processor can also interface with a sensor configured to detect the diameter of a portion of the topping sample entering into the cutting chamber, and the processor can automatically adjust a topping thickness for the topping module in real-time (e.g., by adjusting an offset between the retaining plate 117 and the retaining plate) to achieve a target topping serving volume. For example, an operator, restaurant, franchise, etc. can specify a target topping serving volume for a particular topping type across all topping orders. Alternatively, a patron can specify a topping serving volume for a particular topping type for his food order, or the processor can extrapolate a topping serving volume for a particular topping type from the patron's food order, such as based on a patron preference or order history.

Figure 11:
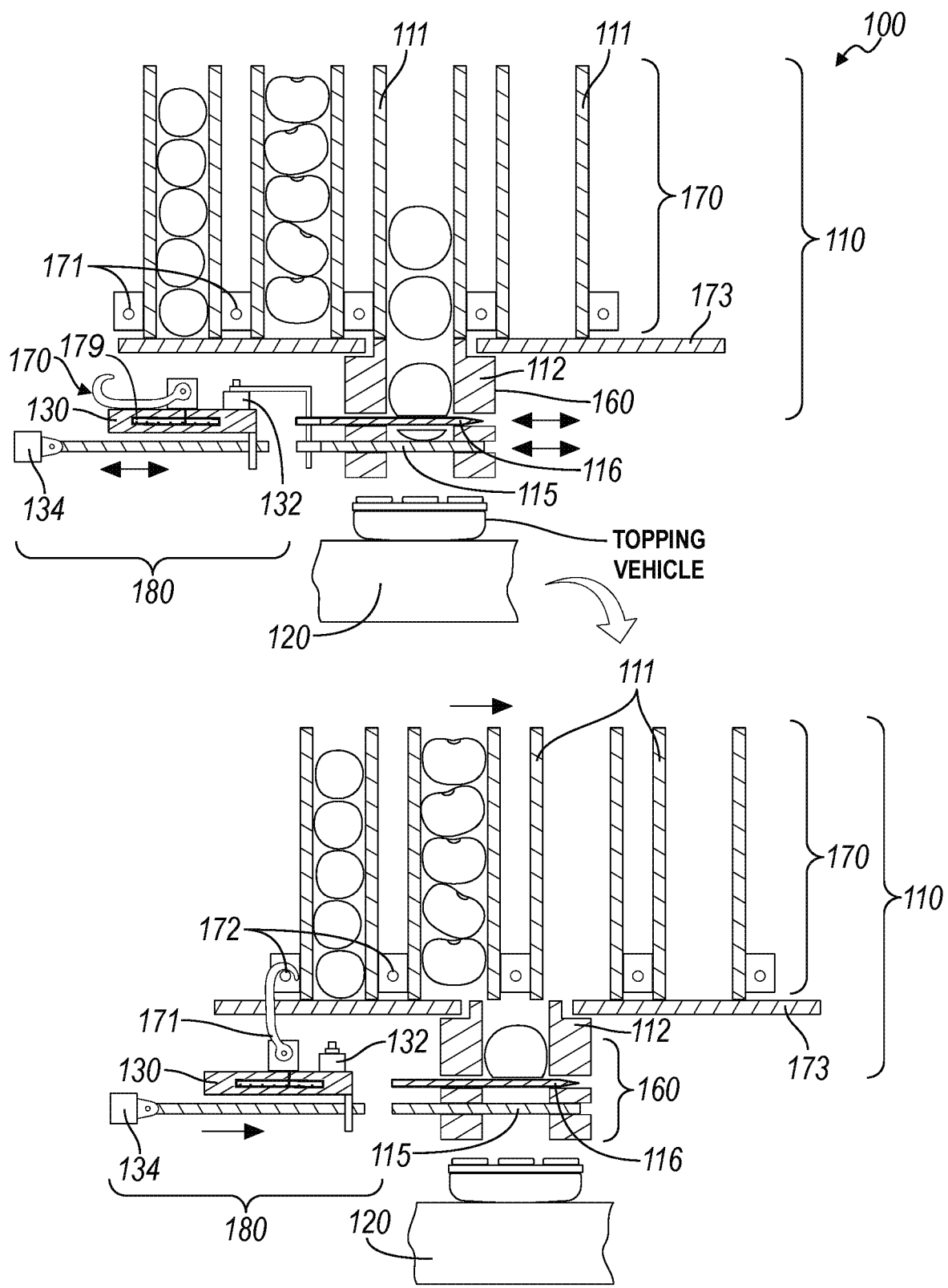
FIG. 11 is a flowchart representation of one variation of the system.

As shown in FIG. 11, a topping module can further include a receiver 160 defining an inlet and an outlet, supporting a corresponding blade 116 and/or a corresponding retaining plate, engaging a hopper (or a hopper magazine 170) to receive (whole) topping samples from the hopper into the inlet, and releasing topping servings from the outlet toward a corresponding dispense position on the conveyor. In one implementation, the receiver 160 cooperates with a hopper, a hopper magazine 170, a blade 116, and/or a retaining plate to define a topping module assembly. In this implementation, the topping module assembly 110 can be transiently installed in the system, such as into a topping module receptacle 190, as described below; in this variation, topping modules dispensing different topping types can be selectively installed in various topping module receptacles within the system to alter topping types supported by the system at any particular time. In this implementation, the topping module 110 can also include one or more discrete actuators in assembly within the receiver 160, the blade 116, and the retaining plate, etc. such that the actuator(s) remain with the topping module 110 when the topping module 110 is installed into and then removed from a topping module receptacle 190 in the system; in this variation, a topping module 110 can further include an electrical plug configured to engage an electrical receptacle in a topping module receptacle 190 to transiently enable high-voltage (e.g., actuation) and low-voltage (e.g., sensor) communications between sensors and actuators within the topping module 110 and a processors and/or a controller within the system. Alternatively, the receiver 160—with a corresponding blade 116 and/or retaining plate—can be substantially intransiently installed in the system (e.g., within a topping module receptacle 190), and a hopper or a hopper magazine 170 can be transiently installed in the system to load the receiver 160 with corresponding topping samples of a corresponding topping type. In this implementation, the receiver 160 can be substantially static within the system, and hoppers or hopping magazines can be swapped into and out engagement with the receiver 160 to adjust a topping type dispensed from the receiver 160; in this variation, a blade 116 and/or a retaining plate within the receiver 160 can also be exchanged—such as by exchanging a straight blade 116 for a serrated blade 116—based on topping types dispensed from hoppers or hopper magazines loaded into the receiver 160. However, the receiver 160 can be of any other form and substantially intransiently or transiently installed in the system in any other way.

However, a topping module 110 can function in any other way to enable real-time customization of a topping serving thickness by modifying the offset between corresponding a retaining plate and blade, and the processor can function in any other way to implement a topping order specifying a custom topping serving thickness.

1.3 Hopper Magazine

In one variation of the system 100 shown in FIG. 2, a topping module 110 includes a chute 112 arranged between a corresponding blade and the discharge end of a corresponding hopper. Generally, the chute 112 of a topping module 110 can be coupled to a corresponding cutting mechanism and configured to feed a topping sample into the blade while the hopper, once emptied, is replaced with another filled hopper or filled with additional topping samples. The chute 112 can be of a length greater than a maximum anticipated length of a topping type designated for the topping module 110. Similarly, the chute 112 can define an axial length less than an axial length of a hopper in the corresponding topping module 110. The corresponding hopper can thus be transiently (i.e., removably) coupled to the chute 112 opposite the cutting mechanism to feed topping samples into the chute 112 and thus into the cutting mechanism. Because the chute 112 can define an axial length greater than an anticipated maximum length of a corresponding topping type, the chute 112 can contain a substantially whole topping sample and the topping module 110 can continue to dispense topping servings from the topping sample while the emptied hopper is replaced with another, full hopper or while the emptied hopper is removed, reloaded with additional topping samples, and replaced into the corresponding topping module 110.

A topping module 110 can therefore include a hopper magazine 170 configured to advance a succeeding hopper into a dispense position over a corresponding blade once topping samples in a preceding hopper are exhausted (e.g., once the last topping sample fully enters the corresponding chute 112). In particular, a topping module 110 can include a magazine of hoppers 170, wherein hoppers in the magazine are configured to contain topping samples of a corresponding topping type and are configured to be selectively indexed over the receiver 160 to dispense topping samples into the corresponding receiver 160. For example, the first topping module 110 can include a hopper magazine 170 configured to support the first hopper 111 and a preceding hopper, both configured to dispense a topping of the first topping type, and the hopper magazine 170 can be configured to advance the first hopper 111 into a dispense position over the first blade 116 in response to exhaustion of the preceding hopper. The magazine can therefore load multiple hoppers into a corresponding topping modules, such as by indexing subsequent hoppers into position over the chute 112 to feed topping samples into the corresponding slicing mechanism once a current hopper is emptied, as shown in FIG. 2. The magazine can support multiple hoppers in a linear fashion and index the hoppers linearly into axially alignment with a corresponding chute 112 of the topping module. For example, as shown in FIG. 11, a magazine can include a track 173 arranged over a receiver 160 (of a corresponding topping module or topping module receptacle 190) and extending from each side of the receiver 160 substantially perpendicular to the conveyor, and the magazine and/or the actuator system 180 can selectively index hoppers in the magazine linearly along the track 173 and into position over the receiver 160 as each hopper in the magazine is exhausted. In this example, the track 173 can define a receiving end and a discard end; the receiving end of the track 173 can receive fresh hoppers loaded with topping samples of a corresponding topping type, and the discard end of the track 173 can discard empty hoppers from the magazine, such as into a holding area or into a bin adjacent the system for later removal (and reloading) by an operator.

The processor, described below, can control any of a discrete linear actuator, rotary actuator, Geneva mechanism, solenoid, and/or indexing head, etc. to advance hoppers in the magazine forward, such as once a hopper currently in a dispensing position over a receiver 160 dispenses a final topping sample into the adjacent receiver 160. For example, the processor can interface with a linear or rotary encoder coupled to the magazine to track a position of the magazine, and the processor can control a discrete actuator coupled to the magazine to index the magazine forward in a direction perpendicular to the conveyor 120 to load a succeeding full hopper into position once a previous hopper is (substantially) fully emptied. In this implementation, a topping module 110 (or a topping module receptacle 190) can thus include a discrete actuator coupled to a discrete hopper magazine 170 of the topping module 110 to enable independent positional control of the hopper magazine 170, thereby enabling the system to maintain a substantially constant and consistent supply of topping samples to the corresponding receiver 160 (or to the corresponding topping module receptacle 190) during operation of the system.

In another implementation, a single actuator (or a single actuator system 180) both selectively advances and retracts the blade 116 and/or the retaining plate of a topping module 110 and selectively indexes the hopper magazine 170 of a particular topping module 110. In particular, in this implementation, an actuator that selectively advances and retracts the blade 116 and/or the retaining plate of a topping module 110 further interfaces with the hopper magazine 170 in the corresponding topping module 110 to advance a first hopper in the magazine past the corresponding receiver 160 and to index a second hopper, behind the first hopper, in the magazine forward over the receiver 160, such as in response to evacuation of a last topping sample from the first hopper.

In one example of the foregoing implementation, the system includes the carriage that includes a beam 131, a selection actuator 132 supported on the beam 131, and a carriage actuator 134 that advances and retracts the carriage. In this example, for the blade 116 and retaining plate in a topping module 110 in the system that are disconnected, the selection actuator 132 can selectively engage and disengage the blade 116 and the retaining plate of the topping module 110 during advance and retract cycles of the carriage to selectively couple and decoupled the blade 116 and the retaining plate from the carriage. Alternatively, for the blade 116 and retaining plate that are connected or coupled (e.g., in an assembly), the selection actuator 132 can selectively engage and disengage the blade-retaining plate assembly to couple and decoupled the blade-retaining plate assembly from the carriage. In this example, the carriage can also include a latch 171—arranged on or coupled to the beam 131—that selectively engages a hopper magazine 170 of the topping module 110 to latch the hopper magazine 170 to the carriage. In particular, once a first hopper currently arranged over a receiver 160 of the topping module 110 dispenses a last topping sample into the receiver 160, the selection actuator 132 can deselect both the blade 116 and the retaining plate 115, the carriage actuator 134 can retract the beam 131 (fully or partially), the latch 171 can engage the magazine hopper, and the carriage actuator 134 can advance the beam 131 (fully or partially) to drive the hopper magazine 170 forward, thereby shifting the first hopper out of position over the receiver 160 and moving a second (full) hopper into position over the receiver 160 to dispense topping samples toward the blade 116. The carriage actuator 134 can thus cooperate with the selection actuator 132 to advance and retract the blade 116 and the retaining plate to dispense topping servings onto topping vehicles supported on the conveyor, and the carriage actuator 134 can also cooperate with the latch 171 to selectively index the magazine hopper forward to align fresh (i.e., full) hoppers with the receiver 160 of the topping module 110. In this example, the latch 171 can include a mechanical, solenoid-actuated latch that engages (e.g., locks to) a bolt 172 extending from the hopper magazine 170. Similarly, the latch 171 can be coupled to the hopper magazine 170 and can engage a bolt 172 extending from the beam 131. Alternatively, the latch 171 can include an electromagnetic latch (e.g., an electromagnet, a transformer, etc.) that magnetically couples to magnetic or ferrous material in the hopper magazine 170 (or vice versa) to periodically advance the hopper magazine 170 forward. However, the latch 171 can mechanically or remotely couple the carriage to the hopper magazine 170 in any other suitable way.

In this foregoing example, the hopper magazine 170 can include a ratchet mechanism 179 that resets to an initial position once the hopper magazine 170 is indexed forward such that the latch 171 can engage and disengage the ratchet mechanism 179 at substantially similar start and end points during an advance or retract cycle of the carriage to index the hopper magazine 170 forward by a distance (roughly) equivalent to a center-to-center distance between adjacent hoppers in the magazine.

Alternatively, the processor can track a position of the hopper module, such as based on previous engage and disengage positions of the latch 171 or based on a position sensor (e.g., a linear encoder) coupled to the magazine. In this implementation, during a magazine index cycle, once a first hopper currently arranged over a receiver 160 of the topping module 110 dispenses a last topping sample into the receiver 160, the processor can initiate a magazine index cycle by triggering the selection actuator 132 to deselect both the blade 116 and the retaining plate and then triggering the carriage actuator 134 to retract the beam to a particular position to place the latch 171 adjacent the bolt 172 (or other feature) in the magazine hopper based on a known position of the bolt 172 in the magazine or based on a disengage position of the latch 171 during a previous magazine index cycle. The processor can then trigger the carriage actuator 134 to advance forward from the particular position by a distance corresponding to the center-to-center distance between adjacent hoppers in the magazine before triggering the latch 171 to release the magazine and then resetting the position of the carriage to begin a new dispense cycle.

In the foregoing implementation, the system can include a set of topping modules, such as arranged in linear fashion along and over the conveyor, with various topping modules in the set including hopper magazines. The carriage can thus include multiple latches configured to selectively engage and disengage corresponding magazines, and the carriage actuator 134 and the latches can cooperate to index select magazines in the set of topping modules as hoppers across the set of topping modules are exhausted of topping samples. Alternatively, each topping module 110 (or each topping module receptacle 190) can include a discrete carriage, including a beam and a carriage actuator 134, and the carriage actuator 134 and the latch 171 of a particular topping module 110 can intermittently index a corresponding hopper magazine 170 forward independently of hopper magazines in other topping modules (or in other topping module receptacles). However, the system, topping module 110, and/or topping module receptacle 190 can include any other actuator configured to index a hopper magazine 170 forward, such as in response to evacuation of (substantially) all topping samples from a hopper currently in a dispensing position over a blade 116 of the corresponding topping module 110.

In this variation, a topping module can also include a topping level sensor, wherein the processor reads an output of the topping level sensor to detect the level of topping samples in a dispensing position over the corresponding cutting mechanism. In this variation, the processor can thus index the magazine forward to load a succeeding (i.e., full) hopper into the dispensing position over the cutting mechanism once the current hopper is emptied (i.e., contains no further topping samples). In one example, hoppers within a topping module are of a translucent material, such as poly (methyl methacrylate) (PMMA, or acrylic), glass, or polycarbonates (PC), and the processor correlates an output of the topping level sensor that includes an optical sensor to estimate a height of topping samples within a hopper in the dispense position. In this example, the optical sensor can be substantially non-transiently arranged outside of and adjacent a hopper dispense position such that the processor can interface with the one optical sensor to detect topping levels in each hopper as the magazine indexes subsequent hoppers into the dispensing position. In this example, the topping level sensor can include an infrared emitter and detector. Alternatively, the topping level sensor can include a camera (e.g., an RGB camera), and the processor can implement machine vision to determine the topping level in a hopper over the cutting mechanism and/or the topping levels in multiple hoppers substantially simultaneously.

In another example, the processor interfaces the topping level sensor that includes a pressure sensor, a strain gauge, and/or a scale, etc. proximal the retaining plate to correlate a pressure-, strain-, and/or weight-related signal from the topping level sensor with a topping level in a hopper in the dispense position over the cutting mechanism. In yet another example, each hopper incorporates a mechanical limit switch that changes output state when the corresponding hopper is emptied. In a further example, the topping level sensor includes an acoustic sensor arranged over the hopper opposite the cutting mechanism and configured to output an acoustic signal into a hopper in the dispense position and to receive a reflected acoustic, wherein the processor interfaces with the acoustic sensor to correlate the reflected acoustic signal with a topping level in the hopper. However, a topping module can include any other suitable type and/or number of topping level sensors, and the processor can interface with the topping level sensor(s) in any other suitable way. Furthermore, once the processor determines that a current hopper is empty (i.e., a final topping sample has fully entered the corresponding chute 112), the processor can index the magazine forward to load a succeeding hopper in the dispense position.

Figure 8:
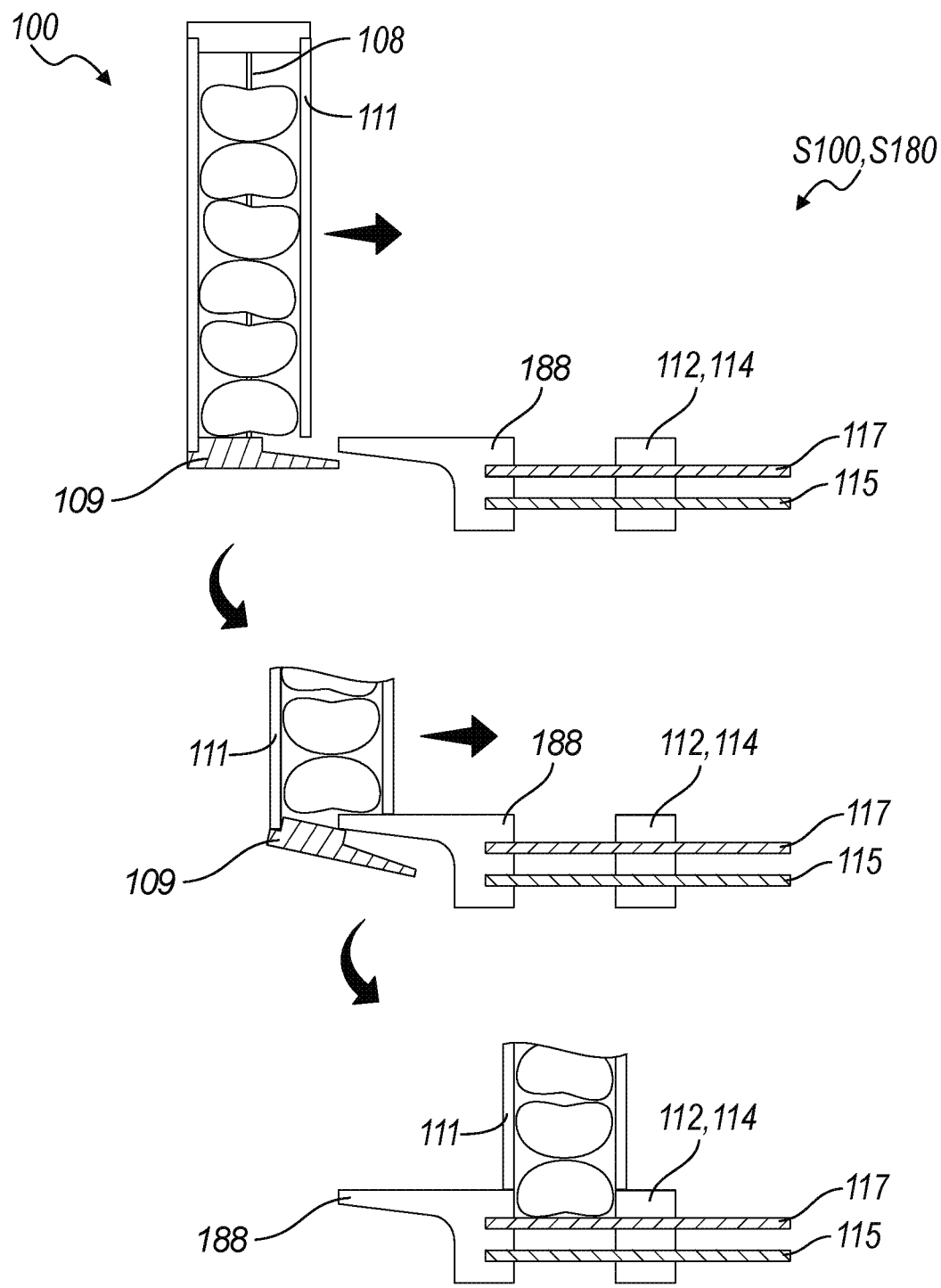
FIG. 8 is a flowchart representation of variations of the system and method.

Furthermore, in the foregoing variation and as shown in FIG. 8, a hopper can include a lid 109 arranged over (or in) a corresponding discharge end to support topping samples within the hopper during transport, such as between a preparation station and the magazine of the corresponding topping module. In one example, a hopper is closed on a far end opposite the discharge end, and an operator sets the hopper discharge end up on a preparation surface, loads the hopper with tomatoes (e.g., ten whole, ripe hot house tomatoes) via the discharge end, places the lid 109 over the discharge end, flip the hopper discharge end-down, and places the hopper into the magazine of a correspond (tomato) topping module. In this example, before the magazine indexes the hopper into the dispense position over the corresponding cutting mechanism the magazine can automatically remove the lid 109 from the hopper. Therefore, a lid 109 can engage a corresponding hopper to support the weight of topping samples when the hopper is full, and/or the magazine can include one or more features to enable automatic and systematic removal of the lid 109 from the hopper.

In one implementation, the lid 109 is circular in cross-section with a lip that engages less than the full circumference of the discharge end of the hopper, the lip interrupted by a ramp, as shown in FIG. 8. In this implementation, the hopper can include an alignment feature to maintain an arcuate position of the hopper along its longitudinal axis, and the magazine and/or the topping module can include a wedge 188 that engages the ramp of the lid 109 to guide the lid 109 off of the hopper as the hopper is moved forward into the dispense position. For example, the wedge 188 can be physically coextensive with the chute 113. In another implementation, the lid 109 includes two parallel wedge 188-shaped channels perpendicular to the longitudinal axis of the hopper, the hopper includes an alignment feature to maintain an arcuate position of the hopper along its longitudinal axis within the magazine, and the magazine includes a pair of ramps that engage the wedge 188s in the lid 109 to guide the lid 109 off of the hopper as the hopper advances into the dispense position. However, the lid 109, the hopper, and/or the magazine can include any other suitable component and/or feature to enable automatic removal of the lid 109 from the hopper as the hopper is advanced into the dispense position adjacent the cutting mechanism.

A hopper can additionally or alternatively include a stake 108 arranged along (i.e., parallel to) the longitudinal axis of the hopper to maintain alignment of the topping samples as topping samples are fed into the cutting mechanism. In one implementation, the stake 108 can be mounted or fixed to the hopper opposite the discharge end of the hopper and proximal the longitudinal center of the hopper, and the cantilevered end of the stake 108 can extend up to (but not beyond) the discharge end of the hopper and include a pointed tip. In this implementation, an operator can load the hopper with topping samples by piercing topping samples with the pointed tip and pressing the samples down the stake 108. For example, the operator can load tomatoes into the hopper by removing the stem form a tomato, piercing the endocarp of the tomato along it concentric axis, pressing the tomato down the stake 108 with the stake 108 passing along the placenta of the tomato, and repeating for additional tomatoes until the hopper is full. Thus, in this example, the stake 108 can maintain topping samples in a particular orientation within the hopper, which can be useful to enable consistent topping serving sizes consistently cut across similar planes of various topping samples, such as consistently substantially perpendicular to the concentric axis of a tomato.

In the foregoing implementation, the stage can be of a uniform size and cross-section, such as 0.2" in diameter, and the stake 108 can be of a food-safe material, such as a stainless steel. The stake 108 can additionally or alternatively include a removable tip of a cross-section larger than the cross-section of a main section of the stake 108. For example, the stake 108 can include a removable 0.35"-diameter tip, wherein an operator places the tip over the discharge end of the stake 108, loads the hopper with topping samples, and removes the tip once the hopper is full. In this example, the removable stake 108 can create a bore, through loaded topping samples, that exceeds the diameter of the main section of the stake 108, which may substantially reduce a possibility that a topping sample will stick to stake 108 when the topping sample should otherwise advance toward the cutting mechanism in the topping module. Alternatively, in the foregoing example, the operator can leave the tip in place, place the lid over the tip, and the lid 109 can retain the tip such that the magazine removes the lid 109 and the tip as the hopper is advanced into the dispense position.

The hopper can additionally or alternatively include a weight arranged between loaded topping samples and a far end of the hopper opposite the discharge end, and the weight can be sizes to apply a suitable force to the topping samples to overcome a stiction (and/or other) force that may prevent a topping sample from advancing into the cutting mechanism. The weight can further engages a feature in the hopper, include an anchoring cable of a particular length, and/or include any other component or feature to prevent the weight from falling into the chute 112 and/or into the cutting mechanism.

Each hopper—and/or any component of the system 100 that contacts a topping, the topping vehicle, or other foodstuff—can be of a food-safe material, such as stainless steel, glass, ceramic, polyethylene terephthalate (PET), or high-density polyethylene (HDPE). However, the hoppers can be of any other suitable material or combination of materials. The hoppers can also be of any other form or geometry, can be arranged or indexed into position over the cutting mechanism in any other suitable way, can be reloaded in any other suitable way and according to any other topping level sensor output, and can include any other feature or component to enable or assist topping loading and/or topping management.

1.4 Heating and Cooling

In one variation of the system 100, a topping module incorporates a heating element configured to heat, steam, sauté, or otherwise cook a topping sample passing through the hopper and into the cutting mechanism. For example, a topping module configured to dispense onion servings can include a heating element to heat and/or grill onions within a corresponding hopper. The heating element can be arranged outside and adjacent the dispense position over the cutting mechanism such that the same heating element can heat each succeeding hopper loaded into the dispense position. The heating element can also extend from adjacent the dispense position to an 'on deck' position and/or and 'in the hole position' for succeeding hoppers in the topping module such that the heating element can substantially simultaneously heat the contents of multiple hoppers substantially or 'preheat' hoppers prior to indexing into the dispense position. For example, the heater can define a planar heating surface arranged parallel to and offset from an indexing direction of the magazine. Alternatively, the topping module can include multiple heating elements, each arranged proximal or adjacent hopper positions for multiple succeeding hoppers containing topping samples. In one example, the heating element includes a quartz heater arranged between two hoppers within the magazine of the corresponding topping magazine, wherein the heating element moves with the two hoppers and heats the contents of the two hoppers substantially simultaneously. Alternatively, heating elements can be incorporated into hoppers such that a heater is replaced with a corresponding hopper as full hoppers are loaded into the system 100 and empty hoppers are removed. In this implementation, the discrete heaters can heat the contents of various hoppers independently, which can yield control over topping cooking time and/or temperature. A topping module can similarly incorporate a cooling system configured to cool the contents of a hopper, such as to extend the freshness of the loaded topping samples. For example, a topping module can incorporate a liquid-to-air heat exchanger to extract heat from a hopper in the dispense position and/or one or more full hoppers in succeeding positions, such as to cool a hopper configured to dispense tomato servings or lettuce.

In the foregoing variation, the system 100 can include a heat shield arranged between hoppers of adjacent topping modules to isolate heating and/or cooling to a particular topping module. In one example, the system 100 can include a heat shield arranged between a heated onion module and an adjacent cooled lettuce module such that heating is isolated to the onion module to cook or sauté the onions and such that cooling is isolated to the lettuce module to extend the freshness of the lettuce.

A topping module can additionally or alternatively include a nozzle configured to spray or deposit steam, water, oil, butter, spices, and/or flavorings onto toppings within a corresponding hopper while contents of the hopper are heated, cooked, sautéed, cooled, within the hopper prior to and/or during dispensation of topping servings from the hopper. However one or more topping modules within the system 100 can include other component or subsystem to maintain, modify, and/or improve the flavor of a corresponding topping type.

The retaining plate and/or the retaining plate 117 can also function to cook or heat a corresponding topping sample and/or a corresponding topping serving. In one example, a retaining guide within a corresponding topping module includes conductive leads that contact and supply current to the retaining plate, thereby heating the retaining plate and warming, cooking, or sautéing a leading face of a corresponding the topping serving in contact with the retaining plate. In another example, a coil adjacent the retaining plate heats the retaining plate via inductive heating, thereby heating an adjacent topping sample. Additionally or alternatively, the retaining plate 117 can be similarly heated. For example, after a blade is advanced through a topping sample and before a corresponding retaining plate is retracted to dispense a topping serving from the topping sample onto a topping vehicle, the retaining plate 117 can be heated to a high temperature (e.g., 800° F.) for a brief period of time (e.g., one second) to sear both a leading face of a topping sample and a trailing face of a topping serving currently within the cutting chamber. In this example, upon subsequent actuation of the blade and the retaining plate, the seared leading face of the topping sample can contact the retaining plate, the blade can be advanced through the topping sample to cut a second topping serving from the topping sample, and the retaining plate 117 can again sear the trailing face of the second topping serving such that both sides of the second topping serving are seared by the retaining plate 117 over two topping dispense cycles.

As in the foregoing implementation, a topping module with a heated retaining plate 117 and/or a heated retaining plate, a corresponding cutting mechanism can also include a nozzle configured to spray or deposit steam, water, oil, butter, spices, and/or flavorings onto the retaining plate 117 and/or onto the retaining plate, such as to improve heating or cooking of a topping serving, improve a flavor of a topping serving, and/or to prevent a topping sample or a topping serving from sticking to the retaining plate 117 or to the retaining plate.

Alternatively, the system can incorporate a heating element outside of and adjacent a topping module. For example, for a topping module 110 configured to grate a block of cheese and to dispense grated cheese onto a topping vehicle (i.e., a "cheese module"), as described below, the system can include a heating element succeeding the cheese module and configured to selectively heat tops of topping vehicles exiting a dispense position adjacent the cheese module to melt cheese dispensed onto the topping vehicles. In this example, the heating element can be selectively actuated (e.g., selectively rapidly heated) to selectively heat topping modules passing adjacent thereto, such as to selectively heat—and to selectively melt cheese on—topping vehicles only onto which cheese was dispensed or to selectively heat topping vehicles corresponding to food orders specifying melted cheese rather than cold cheese. Therefore, in this example, the heating element can be selectively actuated to heat topping servings previously dispensed onto topping vehicles bases on food orders corresponding specifically to each topping vehicle and based on topping types and/or topping dispositions specified in each food order. In this implementation, the heating element can exhibit rapid heating and cooling capabilities to enable the heating element to selectively heat topping vehicles passing into a heating zone adjacent the heating element. For example, the heating element can include a pilot and a gas (e.g., natural gas, propane) burner configured direct a flame toward the heating zone, the conveyor can advance a topping vehicle from a preceding dispense position (e.g., adjacent the cheese module) to the heat zone, and the heating element can selectively project a flame toward the heating zone to heat the topping vehicle based on a callout for a heated or toasted topping (e.g., melted cheese) in a food order corresponding to the topping vehicle. Alternatively, the heating element can include an inductive heating element, resistive heating element, or any other suitable type of heating element. In this implementation, the system can further include a heat shield arranged between the heating element and an adjacent topping module 110, such as between the heating element and a hopper in a preceding cheese module to substantially prevent cheese in the hopper from melting due to heat from the heating element.

Yet alternatively, a topping module 110 can include an internal heating element configured to maintain contents of the topping module 110 substantially above a minimum temperature for the corresponding topping type. For example, the system can include a topping module 110 configured to shred a mass of cooked (e.g., roasted meat) and to dispense servings of shredded meat from the mass of cooked meat, and the processor the system can include a temperature sensor (e.g., a thermistor, a thermocouple) and a heating element thermally coupled to a hopper containing the mass of cooked meat, and the processor can control power delivery to the heating element to maintain a temperature of the mass of meat above a minimum meat temperature based on an output of the temperature sensor. In this implementation, the system can further include a heat shield arranged between the first hopper and the second hopper. A topping module 110 can similarly include an internal cooling element configured to maintain contents of the topping module 110 substantially below a maximum temperature for the corresponding topping type, such as for a topping module 110 arranged along the conveyor adjacent a heating element, as described above.

A blade, a retaining plate 117, and/or a retaining plate of a corresponding topping module can be of a food-safe material, such as 316L stainless steel. For example, the blade can be a ground stainless steel blade. The retaining plate 117 and the retaining plate can be substantially 'two and one-half dimensional' structures and can be machined, etched, stamped, ground, drilled, sheared, or otherwise formed from sheet or plate in one or more single machining or manufacturing operations. As shown in FIGS. 3 and 4, each of the retaining plate 117 and the retaining plate can further incorporate an engagement feature, wherein the carriage 130 is configured to selectively engage the engagement features 119 to sequentially advance and retract the retaining plate 117 and the retaining plate to slice and then dispense a topping serving onto a topping vehicle. In one example implementation, the engagement features 119 are cut or formed into trailing regions of the retaining plate 117 and the retaining plate, such as shown in FIGS. 3 and 4.

1.5 Cheese and Meat

In one variation, a blade (or retaining plate 117) in a topping module 110 can additionally or alternatively include a grated blade (e.g., a "grater"). For example, for a topping module 110 configured to dispense grated cheese, a hopper in the topping module 110 can dispense a whole block of cheese into a grating chamber, and the grated blade can be actuated linearly or in rotation to grate portions of cheese from the cheese block; the retaining plate in the topping module 110 can then be actuated to dispense the portions of grated cheese onto a topping vehicle below. Alternatively, the retaining plate can be arranged between the hopper and the retaining plate 117 and can include a spike, clamp, or other feature that retains the cheese block in position over the retaining plate 117 as cheese is grated from the cheese bock and deposited directly onto the topping vehicle.

In one implementation, as shown in FIGS. 13A and 13B, a "cheese module" configured to grate cheese and to dispense grated cheese portions onto topping modules includes a blade defining an annular grater and a discrete rotary grater actuator configured selectively (e.g., intermittently) rotate the annular grater (about its axis) to grate topping portions of cheese from a cheese block dispensed toward the blade 116 by a hopper arranged over the annular grater, such as based on a request for cheese specified in a food order for a topping vehicle currently arranged in a dispense position under the cheese module. In this implementation, the retaining plate is arranged below the annular blade and collects cheese portions grated from the cheese block by the annular blade, and the carriage, the carriage actuator 134, a selection actuator 132 corresponding to the cheese module can selectively retract the retaining plate to release the cheese portions onto the topping vehicle below. Alternatively, another discrete (linear) actuator can selectively retract the retaining plate—independently of other retaining plates in other topping modules in the system—to release the cheese portions onto the topping vehicle below.

In the foregoing variation, the processor can control a duration and/or a speed of actuation of a grater actuator coupled to the grated blade to grate a particular weight, mass, or volume of cheese from the cheese block. Alternatively, the retaining plate in the cheese module can be coupled to a weighing scale 152 (e.g., a load cell, a strain gauge, etc.), as shown in FIG. 12B, and the processor can trigger a grater actuator to rotate the grater blade, sample an output of the weighing scale 152, correlate the output of the weighing scale 152 with a weight or mass of grated cheese dispensed onto the retaining plate, and stop the grater actuator and then trigger the carriage actuator, selection actuator 132, actuator system 180, or other actuator coupled to the retaining plate to retract the retaining plate to dispense the grated cheese onto a topping vehicle below once a detected weight or mass of grated cheese on the retaining plate substantially matches or reaches a target weight or mass of grated cheese. For example, the processor can implement a target mass or weight of grated cheese predefined as a cheese serving for the system to set a trigger point to cease grating and to dispense grated cheese from the retaining plate onto a topping vehicle below. Alternatively, the processor can implement a target mass or weight of cheese specified in a food order for a particular topping vehicle (e.g., "a little" (0.5 oz), average (1 oz), or "a lot" (1.5 oz)) to set the trigger point to cease grating and to dispense grated cheese from the retaining plate onto the particular topping vehicle below. In this variation, the weighing scale 152 can coupled to the retaining plate I the cheese module and can output a signal corresponding to a quantity of portions of grated cheese collected on the corresponding retaining plate below. For example, the weighing scale 152 can include a load cell supporting one or more corner of the retaining plate or a strain gauge arranged across a cantilevered section of the retaining plate extending below the grater blade. However, the weighing scale 152 can include any other type of scale, coupled to the retaining plate in any other suitable way, and outputting any other signal type corresponding to a weight or mass of grated topping sample collected on the retaining plate.

In one implementation of this variation in which the system includes a first topping module 110 that dispenses slices (e.g., servings) of topping samples (e.g., tomato slices, onion slices, pickle slices) and a second topping module that dispenses grated cheese (or shredded meat), the actuator system 180 can include a first linear actuator selectively advancing and retracting a first blade and/or a first retaining plate of the first topping module 110 independently of a grater actuator coupled to the grater blade of the second topping module, as shown in FIGS. 13A and 13B, such that the grater blade can be actuated over a duration of time to collect a target mass, weight, or volume of cheese on the second retaining plate (e.g., which may take approximately eight seconds) independently of a slicing cycle in the first topping module 110 (e.g., which may take less than two seconds). For example, the grater blade can define an annular grater blade, as described above, coupled to an independently-actuated rotary actuator that rotates the annular grater blade to grate cheese from an adjacent cheese block; or the grater blade can define an planar grater blade coupled to an independently-actuated linear actuator that cycles the planar grater blade back and forth to grate cheese from an adjacent cheese block. In this implementation, the first retaining plate of the first topping module 110 and the second retaining plate of the second topping module can be selectively coupled to the carriage via corresponding selection actuators and then retracted and advanced via the beam by the same carriage actuator. Alternatively, the first retaining plate of the first topping module 110 and the second retaining plate of the second topping module can be independently actuated by corresponding discrete actuators in the actuator system 180.

In a similar variation, the system can similarly include a shredded meat module configured to shred or "pull" meat from a mass of meat dispensed from a corresponding hopper toward a corresponding blade 116. In this variation, the blade 116 can include a planar or annular shredding blade selectively actuated by a corresponding linear or rotary actuator to pull portions of meat from the mass of meat and to dispense the portions of meat onto a corresponding retaining plate below, such as based on a request for the meat specified in a food order for a topping vehicle arranged in a dispense position under the shredded meat module; an actuator coupled to the retaining plate can then retract the retracted plate to release the portion of shredded meat onto the topping vehicle, such as described above.

Figure 14:
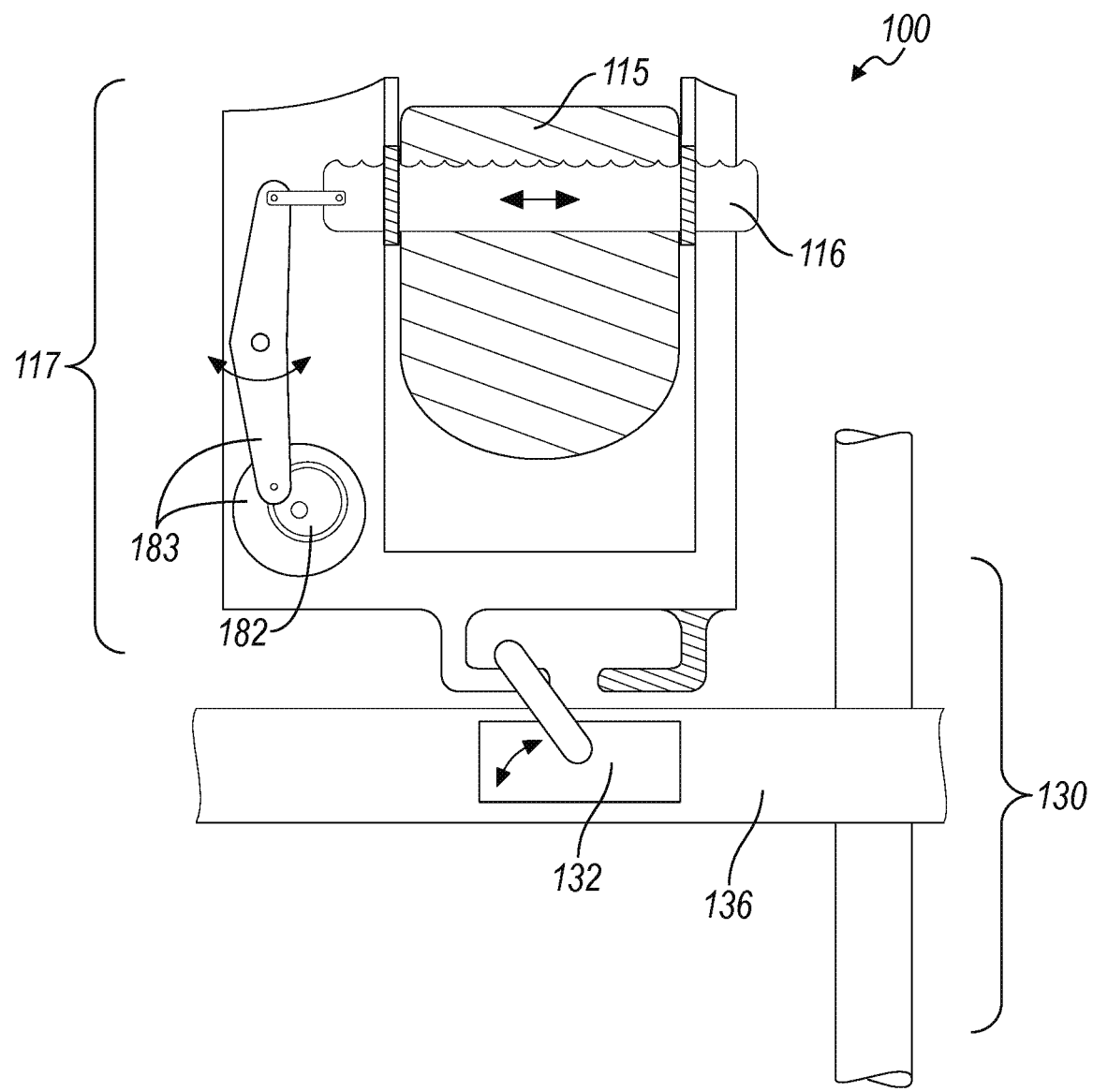
FIG. 14 is a schematic representation of one variation of the system.

In yet another variation, a topping module can include a reciprocating blade 116 reciprocated by an independently-controlled reciprocation actuator 182, such as supported on a receiver or on a carriage in the topping module and coupled to the reciprocating blade 116 with a reciprocating mechanism 183, as shown in FIG. 14. In this variation, the reciprocating blade can define a straight or serrated cutting edge, and the reciprocation actuator 182 can (directly or through the reciprocating mechanism 183) oscillate the blade laterally as the actuator system selectively advances the blade and the retaining plate 115 into and out of the receiver. The blade can thus be reciprocated in a first direction by the reciprocation actuator 182 as the carriage actuator or another actuator within the actuator system advances and retracts the blade in a second direction non-parallel to the first direction. For example, the reciprocation actuator 182 and the carriage actuator can cooperate to manipulate the blade within a topping module configured to dispense tomatoes slices from whole tomatoes or configured to dispense bread slices from a loaf of bread. The reciprocation blade can be actuated to reciprocate the blade along the first direction as the carriage (or other) actuator advances the blade into a topping samples such that a topper serving can be cut cleanly from the topping sample substantially without crushing the topping sample, such as for particular topping types that cut better with reciprocating blades than with static blades. However, the reciprocation actuator 182 and one or more other actuators within the actuator system can cooperate in any other way to cut a topping serving from a topping sample loaded into a hopper of the topping module.

In the foregoing variations, the cheese module can also include a funnel 192 arranged between the retaining plate 115 and the conveyor, the funnel 192 funneling portions of a topping sample—grated by the grater blade—toward a topping vehicle in a correspond dispense position below.

1.6 Waste

A hopper module can also include a waste chute configured to collect waste topping cuts and/or pass waste topping cuts away from the topping module 110. For example, when a new topping sample reaches a retaining plate 117, the processor can signal the waste chute to move to an engaged position, and the processor can trigger the carriage 130 to cycle a corresponding blade and retaining plate to slice a butt end off of the topping sample. In this example, the waste chute can collect the butt end of the topping sample and/or remove the butt end of the topping sample from the topping module 110 such that the butt end of the topping sample is not dispensed onto the topping vehicle. The processor can similarly control the waste chute and the carriage 130 to dispose of the opposing butt end of the topping sample and the butt ends of subsequent topping samples. The processor can implement similar functionality to clear a butt end of first topping sample in a full hopper once indexed into the dispense position by the magazine. The method can interface with an optical sensor (e.g., an infrared sensor, an RGB camera), a mechanical switch, or any other suitable type of sensor to identify a butt end of a topping sample prior or during entry of the butt end into the cutting chamber. The processor can alternatively interface with an angle sensor configured to output a signal corresponding to an angle of an external surface of a topping sample, and the processor can cycle the carriage 130 until the external surface of a topping sample does not exceed a threshold angle, such as ±30° or ±45° from normal to the retaining plate 117.

1.7 Conveyor

The conveyor 120 of the system 100 is configured to advance the topping vehicle 103 from a first position adjacent the first topping module 110 to a second position adjacent the second topping module 110b. Similarly, the conveyor 120 can sequentially advance a first topping vehicle from an initial position to a dispense position adjacent a first topping module (or a first topping module receptacle 190) and can sequentially advance a second topping vehicle 103b, in series behind the first topping vehicle, from the initial position to the dispense position. Furthermore, the conveyor can support a first topping vehicle in a first dispense position adjacent a first topping module (or a first topping module receptacle 190), can support a second topping vehicle in a second dispense position adjacent a second topping module, and can support a third topping vehicle in an initial position behind the second topping vehicle substantially simultaneously and can index (e.g., advance) the first, second, and third topping modules forward once topping servings from the first and second topping modules are selectively dispensed onto the first and second topping vehicles according to corresponding food orders (i.e., individual food orders assigned to individual topping vehicles).

Generally, the conveyor 120 functions to move a vehicle module through subsequent stages (i.e., topping modules) of the system 100, wherein a topping serving is selectively dispensed onto the topping vehicle in each stage according to a topping order corresponding to the topping vehicle. The conveyor 120 can thus cooperate with the topping modules to sequentially add topping servings to the topping vehicle to fulfill the corresponding topping order. The conveyor 120 can also move multiple adjacent topping vehicles through the stages of the system 100 in series with a preceding topping vehicle nearer topping order completion than a succeeding topping vehicle. The conveyor 120 can thus sequentially align a topping vehicle with a cutting mechanism of each topping module, such as by supporting the topping vehicle with a support member configured to engage the topping vehicle and an actuator configured to move the support member through sequential the topping modules.

The conveyor 120 can manipulate the topping vehicle that includes any of a hamburger bun halve (e.g., a bun heel, a bun crown), a bread slice, a hard or soft tortilla, a piece or bed of lettuce, a bed of chip or fries, a cup or bowl of soup, a plate, a bowl, a pan, or any other suitable edible foodstuff or object capable of receiving topping servings (e.g., a plate or box). A first topping module at a head of the conveyor 120 can also cut slices of bread—from a loaf of bread loaded into the first topping module—and deposit these slices of bread sequentially onto the conveyor 120; the conveyor 120 can then advance each subsequent slice of bread forward into dispense positions adjacent succeeding topping modules to receive servings of other toppings, such as lettuce, tomato, bacon, mustard, relish, salt, and pepper to sequentially assemble a line of sandwiches according to food orders corresponding to each of the bread slices.

The support member of the conveyor 120 can position the topping vehicle in-line (e.g., vertically) with an output of a cutting mechanism of one topping module at a time as the conveyor 120 advances the topping vehicle through the set of topping modules. In an example implementation in which the topping modules are arranged vertically over the conveyor 120 (i.e., relative to the ground), the support member can include a platen that constrains the topping vehicle vertically at a suitable distance from the output of each topping module, such as 2" below the retaining plate of a corresponding topping module. Additionally or alternatively, the support member can include one or more tongues that substantially follow a (portion of a) perimeter profile of the topping vehicle. In one example, the tongues are of a flexible material, such as a high-durometer food-safe silicone elastomer, that conforms to the topping vehicle to hold the topping vehicle in a suitable position on the platen. The tongues can similarly include sprung rigid (e.g., sheet stainless steel) fingers to expand and retract to fit the topping vehicle. In another example, each tongue includes a cam follower configured to engage a cam channel along the length of the conveyor 120. In this example, the conveyor 120 can include a looped conveyor track that displaces the platen along the topping modules, and the conveyor 120 can include two mirrored cam channels that close the tongues around the topping vehicle before the topping vehicle enters the first stage (i.e., is aligned with the first topping module 110) and that opens the tongues to release the topping vehicle after the final stage. In this example, the conveyor 120 can loop the platen and corresponding tongues back to a starting position ahead of the first stage to receive and capture a subsequent topping vehicle. However, the tongues can be of any other, rigid, flexible, sprung, and/or guided configuration to support a topping vehicle on a platen throughout the topping stages of the system 100.

The tongues can also extend from the platen to above a broad face of a topping vehicle and thus function as a funnel to guide topping servings from cutting mechanisms onto the broad face of the topping vehicle as the conveyor 120 moves topping vehicle through subsequent stages of the system 100. The tongues can therefore guide topping serving placement on a topping vehicle, thereby enabling substantially accurate topping serving location when multiple topping servings are stacked on a topping vehicle. The support member can similarly include a rigid fence coupled to the platen to retain a topping vehicle and/or to guide topping serving placement onto the topping vehicle. However, the conveyor 120 can include any other component and/or implement any other suitable technique to retain a topping vehicle and/or to guide topping servings onto topping vehicles.

In one implementation, the conveyor 120 includes an actuator and a conveyor belt or chain configured to serially index the support member through the topping modules. For example, the conveyor belt or chain can be supported on each end of the topping modules by rollers, wherein at least one roller is powered by the actuator that includes a rotary electric, pneumatic, or other type of motor. The conveyor 120 can also include one or more guides or channels to support the conveyor belt or chain between the rollers. Alternatively, the conveyor 120 can include a robotic arm, an actuatable table, an independently-controlled mobile vehicle, or any other suitable device or actuator configured to serially moving a topping vehicle into position adjacent multiple topping modules, such as together with preceding and/or succeeding topping vehicles or independently of other topping vehicles. The conveyor actuator can be powered by an electric motor, such as with a 240V three-phase gearhead motor. Alternatively, the conveyor actuator can be powered pneumatically, hydraulically, manually (e.g., via a hand crank), or in any other way or with any other power source.

The processor can cooperate with the conveyor 120 to track the position of a topping vehicle as the topping vehicle is transported through the system 100. In one implementation, the conveyor 120 includes a linear optical encoder and an optical reader, wherein the processor interfaces with the optical reader to detect a relative position of the encoder and to correlate the relative position of the encoder with a position of a topping vehicle within the system 100. The processor can thus control the conveyor actuator according to the position of the topping vehicle to move the topping vehicle though subsequent stages of the system 100. Alternatively, the conveyor 120 can include a powered roller (as described above), wherein rotary motion of the roller is transformed into linear motion of a conveyor belt or chain that displaces the support member retaining a topping vehicle, and the processor can interface with a rotary encoder and encoder reader coupled to the roller to read an angular position of the roller and to convert the angular position of the roller with a linear position of the support member (e.g., relative to a topping module). The processor can alternatively interface with a camera (e.g., an RGB camera) arranged proximal the conveyor 120 and/or a topping module, and the processor can manipulate an output of the camera, via machine vision, to determine a position of a topping vehicle relative to a topping module. The conveyor 120 can additionally or alternatively include one or more limit switches, and the processor can interface with the limit switch(es) to detect a position of the conveyor belt or chain, a position of a topping vehicle, and/or a position of a support member, and the processor can control the conveyor actuator accordingly. The conveyor 120 can additionally or alternatively include an acoustic sensor, a continuous-turn potentiometer or rheostat, a laser distance sensor, another type of rotary or linear encoder, or any other suitable sensor, and the processor can interface with the sensor and/or implement any other suitable signal analysis technique to track a position of the conveyor 120, a support member, and/or a topping vehicle moving through stages of the system 100.

The carriage 130 of the system 100 is configured to retract and advance the first blade 116 and the first retaining plate 115 to dispense a topping serving from the first topping onto the topping vehicle in the first position and to retract and advance the second blade 116*b* and the second retaining plate 115*b* to dispense a topping serving from the second topping onto the topping vehicle in the second position. Generally, the carriage 130 functions to operate blades of multiple topping modules in unison to slice topping servings from various topping samples substantially simultaneously, and the carriage 130 similarly functions to operate retaining plates of multiple topping modules in unison to dispense topping servings from various topping samples onto multiple topping vehicles substantially simultaneously.

In one implementation and as shown in FIG. 1A, the system 100 includes multiple adjacent topping modules arranged linearly (i.e., sequentially). As shown in FIG. 3, the carriage 130 can include a beam 136, a first selection actuator 132 coupled to the beam 136 and configured to selectively engage the first blade 116 and the first retaining plate 115 of the first topping module 110, a second selection actuator 132b coupled to the beam 136 and configured to selectively engage the second blade 116b and the second retaining plate 115b of the second topping module 110b, and a carriage actuator 134 configured to advance and to retract the beam 136. In this implementation, the selection actuators can be spaced along the beam 136 to align with blades and retaining plates of respective topping modules. Each selection actuator can therefore be paired with one topping module, wherein a selection actuator selectively engages a blade and a retaining plate of a corresponding topping module. When the carriage actuator 134 advances the beam 136, the beam 136 can further advance blades and/or retaining plates selected by the set of selection actuators. Additionally or alternatively, when the carriage actuator 134 retracts the beam 136, the beam 136 can further retract blades and/or retaining plates selected by the set of selection actuators. The carriage 130 can thus advance and retract multiple blades and/or retaining plates simultaneously according to positions (i.e., selections) of the selection actuators. The selection actuators can thus select retaining plate 117s in various topping modules to load topping samples into cutting mechanisms of the various topping modules substantially simultaneously with a single retraction throw of the carriage 130, and the carriage 130 can complete an advancement throw to slice topping servings from topping samples in the various topping modules substantially simultaneously. The selection actuators can further select retaining plates in the various topping modules to dispense topping servings from the various topping modules onto adjacent topping vehicles substantially simultaneously with a single retraction throw of the carriage 130, and the carriage 130 can complete an advancement throw to return the retaining plate to complete the current topping serving dispense cycle and prepare for a subsequent cycle. During or soon after the carriage 130 advances the retaining plate at the close of a topping serving dispense cycle, the conveyor 120 can advance the topping vehicle(s) to a subsequent topping module.

In this implementation, as a topping vehicle advances through successive topping modules, the processor can control the position of each selection actuator according to the topping order for the topping vehicle to dispense only topping servings specified for the topping vehicle. For example, if a topping order for a corresponding topping vehicle does not specify pickles or specifies no pickles, the processor can maintain a selection actuator corresponding to a pickle module in a retaining plate selection state during a topping serving dispense cycle such that a pickle sample is not loaded into the corresponding cutting mechanism and such that a pickle serving is not dispensed onto the topping vehicle.

The conveyor 120 can thus substantially simultaneously position multiple topping vehicles adjacent a topping module in the system 100 such that multiple topping vehicles on the conveyor 120 can receive a topping serving from an adjacent topping module—if specified by corresponding topping orders—substantially simultaneously for one topping serving dispense cycle. The conveyor 120 can then index the topping vehicles forward, thus receiving a new topping vehicle at an input end of the conveyor 120 and delivering a completed topping vehicle (i.e., a topping vehicle loaded with all designated toppings) at the output end of the conveyor 120, and the carriage 130 can complete a subsequent topping serving dispense cycle to dispense a subsequent set of topping servings onto the new set of topping vehicles (i.e., excluding the completed topping vehicle and including the new topping vehicle).

In this variation, a selection actuator can include an electromechanical actuator (e.g., a linear solenoid) configured to selectively engage an engagement feature of a corresponding blade in a first position and configured to engage an engagement feature of a corresponding retaining plate in a second position. The actuator can thus switch between two or more states (i.e., positions) to select one or the corresponding retaining plate and the corresponding retaining plate 117. In this implementation, a blade and a retaining plate within a topping module can include opposing engagement features 119 that define hooks (shown in FIG. 4), and, when the carriage 130 is in a fully advanced position, a corresponding selection actuator can displace a pin between the hook of the blade and the hook of the retaining plate to select one of the two. Alternatively, the blade and the retaining plate can include or can be coupled to a ferrous (i.e., magnetic) material, and a corresponding selection actuator can include two electromagnets, each paired with one or the blade and the retaining plate such that the processor can selective activate one of the two electromagnet of the selection actuator to select one of the blade and the retaining plate. Similarly, the blade can include or can be coupled to a magnetic material polarized in a first direction, the retaining plate can include or can be coupled to a magnetic material polarized in a second opposing direction, and the selection actuator can include an electromagnet, wherein the processor reverses the polarity of the electromagnet to select between the blade and the retaining plate. However, a selection actuator can include any other type of actuator, such as a rotary electromechanical actuator, a pneumatic or hydraulic actuator, an electromagnet, or a mechanical cam and latch (e.g., that switches states with at the end of each carriage 130 advancement unless blocked by the processor according to a corresponding topping order), and the processor can control each selection actuator in any other suitable way.

In this implementation and as shown in FIG. 3, the beam 136 of the carriage 130 can ride on one or more linear tracks 138 or 'ways,' such as a one track of circular cross-section proximal each end of the beam 136. In this implementation, the beam 136 can be coupled to the carriage actuator 134 via a timing belt, a connecting rod, or a lead screw, etc. to drive the beam 136 along the track(s) 138. However, the beam 136 can ride on any other suitable type of track or guide of any other shape or geometry, and the beam 136 can be coupled to the carriage actuator 134 in any other suitable way.

In another implementation, the carriage 130 includes two beams, including a cutting beam and a retaining beam. In this implementation, the cutting beam can include selection actuators controlled by the processor to select and to deselect blades for various topping modules according to topping orders for topping vehicles currently on the conveyor 120, such as described above. Similarly, the retaining beam can include selection actuators controlled by the processor to select and to deselect retaining plates for various topping modules according to topping orders for topping vehicles currently on the conveyor 120, such as described above. The cutting beam and the retaining beam can be driven together, such as by one carriage actuator 134, or independently, such as by two independently-controlled carriage actuators.

In yet another implementation, the carriage 130 includes a set of phased crank pairs, wherein each crank pair includes a blade crank coupled to a corresponding retaining plate 117 and a retaining crank coupled to a corresponding retaining plate. The set of crank pairs can be actuated via share a common lay shaft (or crankshaft) such that rotation of the lay shaft (i.e., by the carriage actuator 134) actuates all or a selection of blades out of phase (e.g., 180° out of phase) with all or a selection of the retaining plates. In this implementation, a blade crank and a retaining crank can be coupled to the lay shaft via a cam or eccentric such that the cranks translate rotary motion of the lay shaft into linear or curvilinear motion at the blades and retaining plates. The carriage 130 can further implement a quick-return or Whitworth linkage such that speed of advancement differs from speed of retraction of the blades and/or retaining plates. A quick-return or Whitworth linkage can thus enable fast advancement of a blade through a corresponding topping sample, which may yield cleaner topping cuts. A quick-return or Whitworth linkage can also enable slow retraction of a retaining plate, which may minimize damage to a serving slice. Furthermore, a retaining crank and a corresponding cutting crank can be phased by other than 180°. For example, a crank pair can be phase by 150° such that a retaining plate begins a retract stroke before a corresponding blade is fully advanced. Alternatively, blades of the topping modules can be coupled to a first lay shaft, and retaining plates of the topping modules can be coupled to a second lay shaft that is driven out of phase (e.g., variably) with the first lay shaft. The lay shaft(s) can be actuated at a constant speed and in a constant direction, at a variable speed and/or direction, at a constant or variable phase (if applicable) etc.

In other implementations, the carriage 130 includes one beam per topping module, wherein the processor controls a carriage actuator 134 and a selection actuator for each topping module to selectively dispense topping servings onto corresponding topping vehicles. However, the carriage 130 can include any other number of carriages, carriage actuator, selection actuators, etc. of any other arrangement and controlled in any other suitable way to enable advancement and retraction of the blades and retaining plates of the topping modules.

Figure 10:
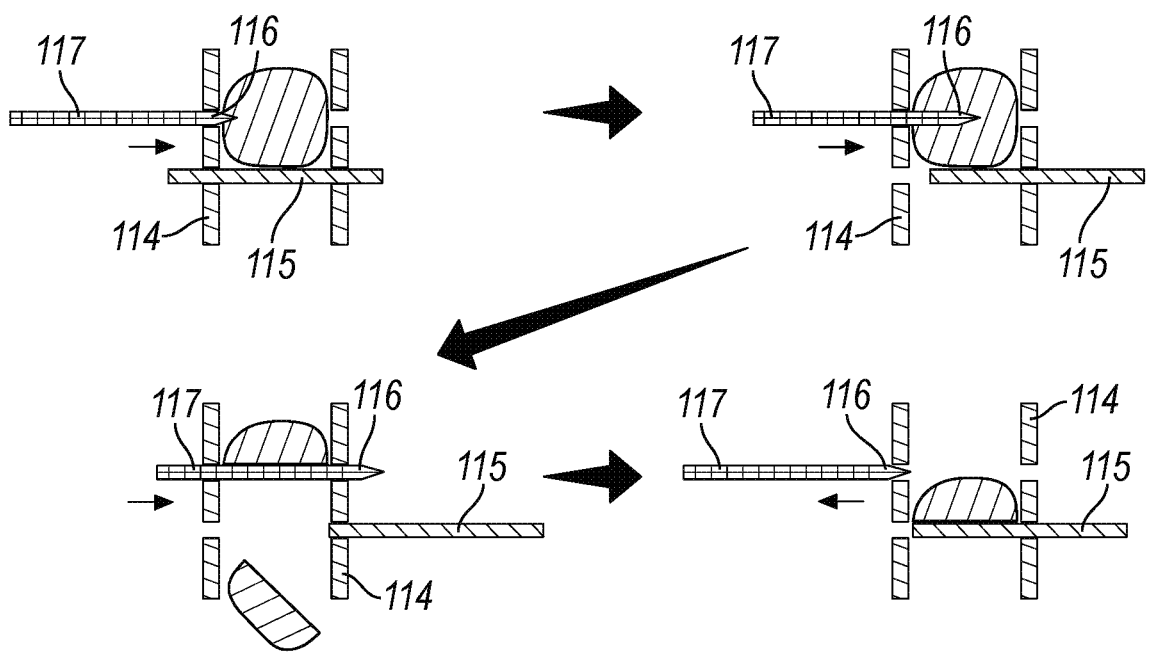
FIG. 10 is a flowchart representation of one variation of the system.

In still another implementation, a retaining plate 117 and a retaining plate in a corresponding topping module can be actuated in unison (e.g., locked in phase, substantially rigidly linked in an assembly). In one example, the retaining plate 117 is vertically offset from the retaining plate by the desired topping thickness, the leading edge of the blade substantially over a trailing edge of the retaining plate, as shown in FIG. 10. In this example implementation, a topping dispense cycle can begin with the cutting plate/retaining plate assembly fully advanced. A corresponding selection actuator can subsequently select the cutting plate/retaining plate assembly (according to a corresponding topping order), and the carriage 130 can retract the cutting plate/retaining plate assembly, thereby retracting the blade and loading the corresponding topping sample into the cutting chamber in a single retraction stroke, as shown in FIG. 10. The carriage 130 can subsequently advance the cutting plate/retaining plate assembly, thereby slicing a topping serving from the topping sample and dispensing the topping serving in a single advancement stroke, as shown in FIG. 10. Therefore, as in this implementation, the carriage 130 can complete a topping dispense cycle in a one advancement stroke and one retraction stroke. Similarly, a blade and a retaining plate 115 in a topping module can be coupled in an assembly with a leading edge of the blade laterally offset from a leading edge of the retaining plate 115 such that the actuator can advance (or retract) the assembly forward to slice a serving from a topping sample dispensed from a corresponding hopper and such that the actuator can retract (or advance) the assembly to dispense the serving onto a topping vehicle in an adjacent dispense position, such as based on a request for the topping type in a food order specific to the topping vehicle.

In the forgoing variations and implementations, the carriage 130 can advance and retract a blade linearly and planar to a broad face of the blade. The carriage 130 can similarly advance and retract a retaining plate linearly and planar to a broad face of the retaining plate. However, the carriage 130 can advance and retract a blade and/or a retaining plate in an arcuate, elliptical, circular, oscillatory, or other motion. The carriage actuator 134 can be a rotary actuator, such as a DC electric motor, a servo motor, a stepper motor, a pneumatic motor, etc., and the rotary motion actuator can be coupled to the beam 136 via a timing belt, a chain, a crank, or any other suitable linkage. Alternatively, the carriage actuator 134 can be a linear actuator, such as a solenoid, a pneumatic ram, DC electric linear actuator, etc. Furthermore, the carriage actuator 134 include a mechanical, electromechanical, pneumatic, hydraulic, piezoelectric, or other type of actuator to motivate the carriage 130, blades, and/or retaining plates along a linear, curvilinear, arcuate, elliptical, or other path.

1.8 Processor

As shown in FIG. 2, one variation of the system 100 further includes a processor configured to control selection of the first blade 116 and the first retaining plate 115 by the carriage 130 according to a topping order specifying the first topping type for the topping vehicle. Generally, the processor functions to control selection of blades, selection of retaining plates, actuation of the carriage 130, and the position of the conveyor 120 to advance topping vehicles through the topping modules and dispense topping servings onto the topping vehicles according to corresponding topping orders. The processor can therefore control various components of the system 100 to fulfill custom topping orders specific to various topping vehicles at various stages of build within the system 100.

The processor can thus maintain and implement a topping order corresponding to each topping vehicle in the system 100. Generally, a topping order can specify which topping types are to be deposited on a corresponding topping vehicle, and the processor can implement a topping order by selectively controlling which blades and which retaining plates are selected by the carriage 130 during each carriage cycle as the conveyor 120 indexes the topping vehicle through the topping modules. For example, for a topping vehicle associated with a particular topping order, when the topping vehicle is indexed to a first position (i.e., aligned with the first topping module 110), if the topping order includes a request for the first topping type corresponding to the first topping module 110, the processor can control a selection actuator corresponding to the first topping module 110 to sequentially select the first blade 116 and the first retaining plate 115 and actuate the carriage 130 to dispense a topping serving of the first topping type onto the topping vehicle. Furthermore, when the topping vehicle is indexed forward into a second position (i.e., aligned with the second topping module 110b), if the topping order does not include a request for a second topping type dispensed by the second topping module 110b, the processor can control a corresponding selection actuator to prevent dispensation of a topping serving from the second topping module 110*b* onto the topping vehicle during a subsequent carriage cycle.

The processor can receive a topping order from a patron, such as through a customer interface (e.g., a touchscreen) coupled to the system 100, through a wireless connection to a mobile computing device (e.g., a smartphone) carried by the patron, or routed from a mobile computing device carried by the patron, through a computer network (e.g., the Internet), to the processor. In one example, the customer interface is accessible through a native application executing on a personal mobile electronic device, such as a cellular phone, a smartphone, or a tablet. In another example, the customer interface is accessible through a web browser executing on an electronic device, such as a cellular phone, a smartphone, a tablet, or a desktop computer.

The topping order can be a component of a complete hamburger order that also includes a custom patty order (e.g., meat type, doneness), a sauce or condiment order (e.g., ketchup, mustard, relish, barbecue sauce), and/or a bun order (e.g., bun type, bun toast level), etc. For example, in one implementation described above in which the system 100 is a subsystem of an automated hamburger making machine and wherein the topping vehicle is a halve of a hamburger bun, the complete custom hamburger order can include a topping order specifying lettuce, onion, pickle, and tomato, a condiment order specifying ketchup, mayonnaise, mustard, and relish, and patty order specifying a medium-rare ½ lb. beef patty. In this example, the system 100 can include multiple topping modules, each dispensing a distinct topping type, including one of lettuce, onion, pickle, and tomato. The automated hamburger making machine can also include separate dispensers for ketchup, mayonnaise, mustard, and relish and a custom patty grinding subsystem and patty grilling subsystem. Furthermore, in this example, a hopper of a corresponding topping module can be configured to accept fresh produce, to slice the fresh produce, and to dispense servings from the fresh produce onto hamburger buns. The topping order can similarly be a component of a complete sandwich order, a complete salad order, a complete burrito order, etc. and implemented by the processor within an automated salad, salad, burrito, or other foodstuff assembly machine.

The processor can store a topping order on a data storage module, such as in the form of an array of pointers indicating which toppings to dispense and which toppings not to dispense onto a corresponding topping vehicle. The processor can thus step through a pointer array as a corresponding topping vehicle is indexed through the topping modules. The processor can also step through a pointer array for each of multiple topping vehicles as the topping vehicles progress through the topping modules. For example, the processor can implement a particular pointer in each array for the various topping modules according to the current stage of each topping vehicle in the system 100. However, the processor can handle one or more topping orders in any other suitable way to control topping dispensation onto one or more topping vehicles.

The processor can also incorporate feedback mechanisms to control operation of any one or more components of the system 100. In one implementation, the carriage 130 includes an encoder, a camera, a limit switch, an acoustic sensor, a continuous-turn potentiometer or rheostat, or a laser distance sensor, etc., and the processor implements an output of the sensor to determine the position of the carriage 130 and to implement closed-loop feedback to manipulate the position of the carriage 130. The carriage 130 can similarly include a tension sensor in a timing belt coupled to the carriage actuator 134, a strain gauge proximal a beam-track junction, a pressure sensor adjacent a cutting plate-beam contact area, etc., and the processor can implement outputs from any of the foregoing sensors to monitor actuation of the carriage 130, to detect a total cutting forces across all blades, and/or to detect a cutting forces for individual blades. For example, the processor can correlate a signal from a pressure sensor or a strain gauge proximal a contact area between the beam 136 and the carriage 130 with a sharpness of a corresponding blade. In this example, the processor can trigger an alarm, throw a flag, and/or alert an operator, etc. if the determined blade sharpness drops below a threshold sharpness. In a similar example, the processor correlates a current draw of an electric carriage actuator 134 (measured with an ammeter) advancing the carriage 130 with a sharpness of one or more blades in the system 100, and the processor further triggers an alarm in response to a determined blade sharpness below a threshold blade sharpness. A topping module can also include an optical (e.g., infrared) sensor, a mechanical sensor, or other sensor adjacent an output end of a corresponding cutting mechanism, and the processor can monitor an output of the sensor to confirm that a topping serving was deposited from the topping module as expected. In this implementation, if deposition of a topping serving from a particular topping module was not detected by the processor, the processor can repeat the previous topping dispense cycle for the particular topping module (but deselect all other topping modules) to attempt successful deposition of a topping slice from the particular topping module. Furthermore, in this implementation, if a topping slice is not dispensed from the particular topping module after a threshold number of attempts (e.g., two), the processor can trigger an alarm, throw a flag, and/or alert an operator, etc. Additionally or alternatively, the processor can increase the speed of a cut stroke of the carriage 130 to compensate for blade wear, such as in response to an output from a force sensor coupled to the carriage 130 that exceeds a threshold force level indicating blade wear.

In another implementation, the processor receives an output from an ammeter electrically coupled to the conveyor actuator, and the processor maintains a conveyor actuator current draw below a threshold current draw in order to extend a user life of the conveyor actuator. The processor can also receive signals from encoders or other rotary or linear position sensors throughout the system 100 and matches cycle times and positions of multiple components with the speed and position of the conveyor 120.

As described above the processor can also receive a signal from a hopper level sensor and control a corresponding hopper magazine 170 to index a full hopper into a dispense position when the hopper level sensor indicates that a current hopper is empty (e.g., a final topping sample has fully entered a corresponding chute 112). The processor can also interface with an optical sensor (e.g., a camera) arranged over the conveyor 120 and implement machine vision to determine the stability of a topping stack on a topping vehicle passing through the topping modules. In this implementation, the processor can adjust the speed of the conveyor 120 to substantially ensure that toppings in the topping stack do not fall off of the topping vehicle and/or to substantially ensure that additional topping servings properly settle on the current topping stack. However, the processor can receive any other signal from any other sensor within the system 100 and can control any one or more components in the system 100 according to one or more sensor signals and/or in any other suitable way.

1.9 Actuator System

In one variation, the system includes an actuator system 180 including multiple discrete actuators coupled to various discrete topping modules and/or topping module receptacles within the system. For example, the actuator system 180 can include a first linear actuator coupled to a first blade of a first topping module receptacle 190 within the system and can include a second linear actuator coupled to a second blade of a second topping module receptacle within the system, wherein the first linear actuator is actuatable independently of the second linear actuator. In this example, the first actuator can also selectively advance and retract the first blade and the corresponding first retaining plate relative to the first receiver 160 in the first topping module receptacle 190 to dispense a serving of a first topping type from the first receiver 160 onto a first topping vehicle in the first dispense position based on a request for the first topping type in a food order corresponding to the first topping vehicle. The conveyor can then advance the first topping vehicle forward to a second dispense position under the adjacent second topping module (or second topping module receptacle), and the second linear actuator can selectively advance and retract a second blade and a second retaining plate (relative to a second receiver) of the second topping module 110 to dispense a serving of a second topping type from the second receiver onto the first topping vehicle (now in the second dispense position) based on a request for the second topping type in the food order corresponding to the first topping vehicle.

In the foregoing example, the conveyor can support the first topping vehicle in the first dispense position and a second topping vehicle in the second dispense position substantially simultaneously, and the first linear actuator and the second linear actuator can selectively and independently (and substantially simultaneously, when applicable) advance and retract the blade and the retaining plate 115 relative to the receiver 160 of the first topping module 110 and the second blade and the second retaining plate relative to the second receiver, respectively, to dispense the serving of the first topping type onto the first topping vehicle in the first dispense position based on the first food order for the first topping vehicle and to dispense a serving of the second topping type from the second receiver onto the second topping vehicle in the second dispense position based on a second food order for the second topping vehicle, respectively (and substantially simultaneously, when applicable).

In the foregoing variation, a topping module 110 or a topping module receptacle 190 can therefore include one or more discrete actuators selectively actuating a corresponding blade and/or retaining plate 115. For example, a topping module 110 can include a pneumatic, electromechanical, or hydraulic linear actuator directly coupled to a blade in the topping module 110 and independently actuated through a corresponding valve or motor driver. In this example, the topping module 110 can include a similar discrete actuator coupled to a retaining plate 115 and independently actuated through a second corresponding valve or motor driver. Alternatively, the topping module 110 can include a single primary actuator selectively coupled to the blade and the retaining plate 115 by a selection actuator 132, such as described above; the selection actuator 132 can similarly include a pneumatic, electromechanical, or hydraulic actuator or solenoid. For example, the topping module 110 can include an carriage (independent of carriages in other topping modules in the system) driven by the primary actuator, and a selection mounted on the carriage can selectively couple the carriage to the blade and to the retaining plate 115, as described above.

However, the actuator system 180 can include any other suitable type of actuator arranged in any other way to selectively and independently advance and retract blade and retaining plates across various topping modules within the system.

1.10 Topping Module Receptacle

As shown in FIG. 12, one variation of the system includes a topping module receptacle 190 arranged over the conveyor and transiently receiving a topping module 110. Generally, in this variation, the system includes a series of topping module receptacles that can be reconfigured with various topping modules dispensing different types of toppings such that the system can be reconfigured over time to assemble different types of foodstuffs (e.g., salads, sandwiches, hamburgers, and burritos), to assemble different menu items (e.g., a breakfast sandwich, a lunch sandwich, and a dinner sandwich), and/or or to dispense different types of toppings from the system, such as seasonal vegetables (e.g., avocado, eggplant, jicama, okra, and tomatillos). A topping module receptacle 190 can therefore be substantially intransiently (e.g., permanently) installed in the system and can define a cavity or other volume for engaging and disengaging various topping modules over time, such as topping modules configured to contain and dispense topping types (e.g., pickle, tomato, or mushroom, etc.), configured to dispense topping servings in different formats (e.g., wavy or flat pickles, finely-grated or coarsely-grated cheese, thick or thin tomato slices, etc.), configured to dispense topping servings in different orientations (e.g., focused at a center of a dispense position or evenly distributed across a dispense position), etc.

In one example, the system includes a set of topping module receptacles loaded with a first set of topping modules corresponding to a lunch menu item (e.g., a lunch salad, a cold sandwich) while the system is in operation during a lunch period, such as from 10:30 AM to 3 PM on a weekday. In this example, the first set of topping modules can be removed from the set of topping module receptacles, and the set of topping module receptacle 190 can be reloaded with a second set of topping modules corresponding to a dinner menu item (e.g., a hamburger, a hot sandwich), such as between 3 PM and 3:30 PM on the weekday, in preparation for fulfilling dinner orders from a dinner menu from 3 PM to 11 PM on the weekday. In this example, during the lunch hour, the set of topping module receptacles can host the first set of topping modules that dispense avocado and tomato, and the set of topping module receptacles can then be reconfigured to host the second set of topping modules that dispense sautéed mushrooms and cheese in preparation for the dinner hour. The set of topping module receptacles can therefore be operable in a first configuration during a first period of time and operable in a second configuration during a second period of time;

Topping modules can define topping type-specific geometries (e.g., hoppers sized specifically for a particular topping type, such as tomatoes versus pickles versus lettuce), can include blades configured to slice, cut, or grate a particular topping type, can include "dumb" retaining plates without weighing scales or "smart" retaining plates with weighing scales, can include funnels, etc. as applicable to the corresponding topping type. Topping modules can define geometries, blades, retaining plates, etc. based on a seasonal availability of topping types, such as an internal diameter of 3" of hoppers in a topping module 110 corresponding to winter and spring tomatoes and an internal diameter of 4" for hoppers in a topping module 110 corresponding to summer and fall tomatoes. Because a topping module 110 can thus be specialized in configuration and components for the topping type it dispenses, the system can include one or more topping module receptacles that can transiently host various topping modules corresponding to different topping types to enable the system to support different types of foodstuff (e.g., sandwiches, salads, or burritos), to accommodate different toppings are availabilities of the toppings change over time (e.g., seasonally), to enable a single generic type system to be configured for different applications in different service, catering, or restaurant environments, etc.

A topping module 110 can therefore define a complete (e.g., self-contained) unit including a hopper, a hopper magazine 170, a receiver 160, a blade, a retaining plate 115, a weighing scale 152, an actuator system 180, a selection actuator 132, a carriage, and/or a carriage actuator 134. A topping module receptacle 190 within the system can define a cavity that receives complete topping module assemblies. A topping module receptacle 190 can also include an electrical receptacle (or socket) that engages one or more plugs of a complete topping module assembly 110 (or vice versa) to enable a driver within the system to control and/or power various actuators within the complete topping module assembly 110 and to enable a processor to sample one or more sensors within the complete topping module assembly 110. A topping module 110 can thus transiently engage a topping module receptacle 190 and can be removable from the topping module receptacle 190 in unit, and a second topping module can transiently engage the topping module receptacle 190 in replacement of the first topping module 110.

Alternatively, a topping module receptacle 190 can include a receive, a blade, a retaining plate 115, a weighing scale 152, a selection actuator 132, and/or a carriage actuator 134, as applicable, and the topping module receptacle 190 transiently engages a topping module 110 including a hopper magazine 170. In this implementation, a topping module 110 can be limited to a receiver 160, a hopper, and/or a hopper magazine 170, and hoppers configured to dispense different topping types can be installed into a topping module receptacle 190 over time to reconfigure the topping module receptacle 190 to dispense servings of different topping types. For example, a first hopper magazine 170 containing hoppers configured to dispense a first topping type can be installed in the topping module receptacle 190 during a first period of time to dispense topping servings of the first topping type; the first hopper magazine 170 can then be swapped from the topping module receptacle 190 for a second hopper magazine containing hoppers configured to dispense a second topping type during a subsequent period of time to dispense topping servings of the second topping type.

2. Method

Figure 5A:
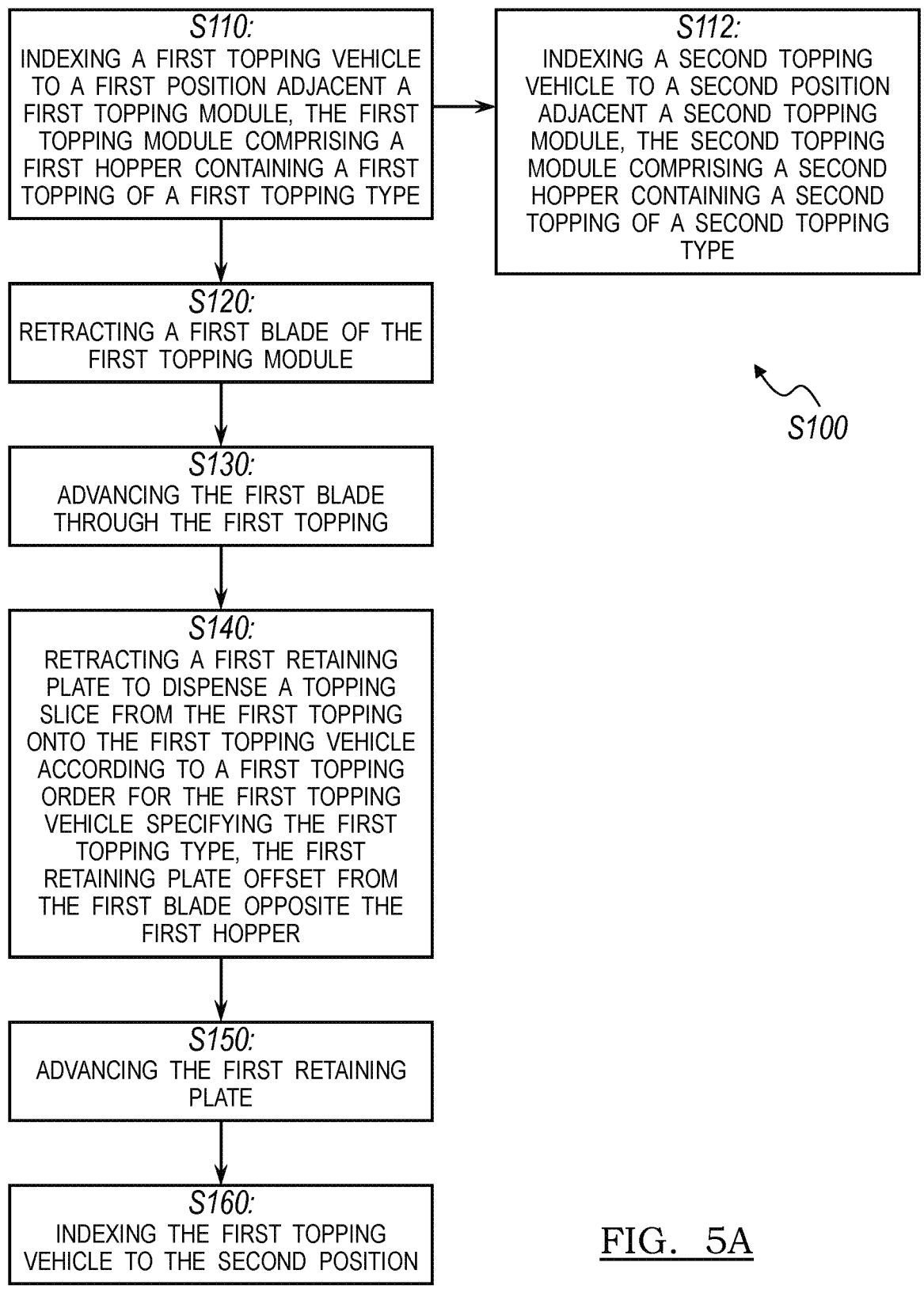
FIG. 5A is a flowchart representation of a method of one embodiment.

As shown in FIG. 5A, method S110 for dispensing toppings onto topping vehicles includes: indexing a first topping vehicle to a first position adjacent a first topping module 110 in Block S110, the first topping module 110 including a first hopper 111 containing a first topping of a first topping type; indexing a second topping vehicle to a second position adjacent a second topping module 110*b* in Block S112, the second topping module 110*b* including a second hopper 111*b* containing a second topping of a second topping type; retracting a first blade 116 of the first topping module 110 in Block S120; advancing the first blade 116 through the first topping in Block S130; retracting a first retaining plate 115 to dispense a topping slice from the first topping sample onto the first topping vehicle according to a first topping order for the first topping vehicle specifying the first topping type in Block S140, the first retaining plate 115 offset from the first blade 116 opposite the first hopper 111; advancing the first retaining plate 115 in Block S150; and indexing the first topping vehicle to the second position in Block S160.

Figure 6:
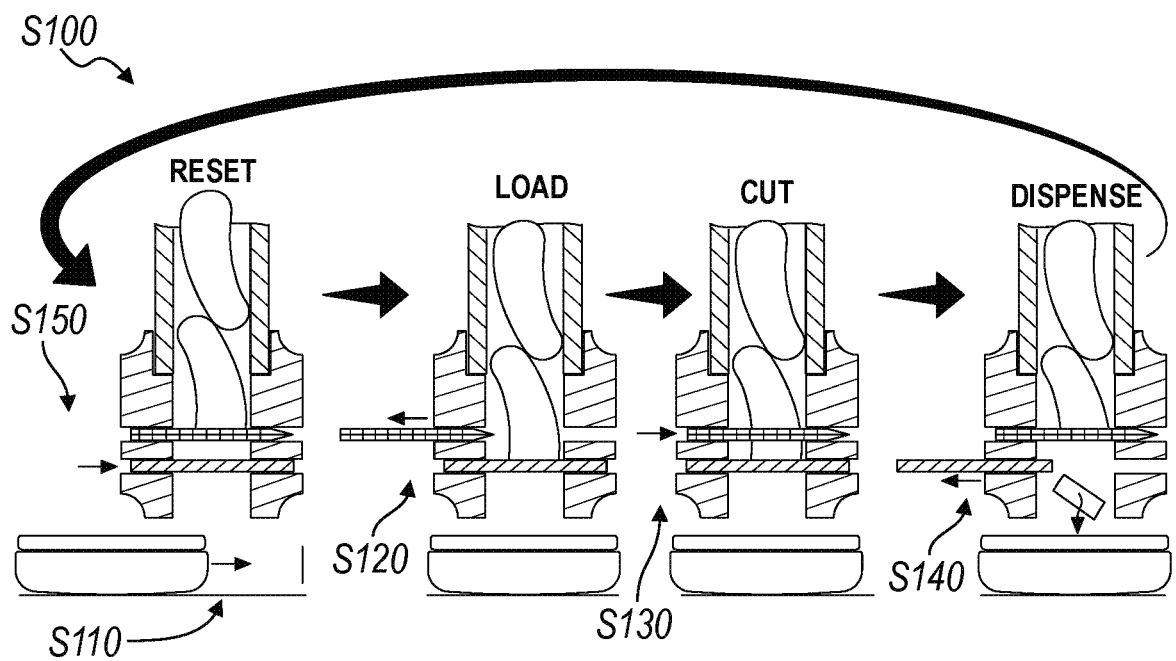
FIG. 6 is a flowchart representation of a variation of the method.

Generally, the method can be implemented by the system 100 described above to dispense topping servings onto topping vehicles. Blocks S110, S112, and S160 can be controlled by the processor and implemented by the conveyor 120 of the system 100 described above, and Blocks S120, S130, S140, and S150 can be controlled by the processor and implemented by the carriage 130 of the system 100 described above. Blocks S120, S130, S140, and S150 can also define a load stroke, a cut stroke, a dispense stroke, and a reset stroke, respectively, as shown in FIG. 6.

Block S110 of method S100 recites indexing a first topping vehicle to a first position adjacent a first topping module 110, the first topping module 110 including a first hopper 111 containing a first topping of a first topping type. Similarly, Block S112 of method S100 recites indexing a second topping vehicle to a second position adjacent a second topping module 110*b*, the second topping module 110*b* including a second hopper 111*b* containing a second topping of a second topping type. Generally, Blocks S110 and S112 function to position a first and a second topping vehicle into positions to receive a topping serving from a first topping module 110 and to receive a topping serving from a second topping module 110*b*, respectively, as described above.

Block S120 of method S100 recites retracting a first blade 116 of the first topping module 110. Generally, Block S120 defines a load stroke in which the blade of a corresponding topping module is retracted, thereby enabling a topping sample to advance through a corresponding hopper and into a corresponding cutting chamber. Once a portion of the topping sample advances into the cutting chamber, the topping sample can be retained by a corresponding retaining plate in a fully-advanced position. As described above, the processor can implement Block S120 by controlling a corresponding selection actuator to select the retaining plate 117 and subsequently controlling the carriage actuator 134 to retract the selected retaining plate 117.

Block S130 of method S100 recites advancing the first blade 116 through the first topping. Generally, Block S130 defines a cut stroke in which the blade of a corresponding topping module is advanced, thereby slicing a topping serving from the corresponding topping sample. Once the retaining plate 117 is advanced in Block S130, the cutting serving is trapped between the retaining plate 117 and the retaining plate. As described above, the processor can implement Block S130 by controlling the carriage actuator 134 to advance the selected retaining plate 117 into the topping sample.

Block S140 of method S100 recites retracting a first retaining plate 115 to dispense a topping slice from the first topping onto the first topping vehicle according to a first topping order for the first topping vehicle specifying the first topping type, the first retaining plate 115 offset from the first blade 116 opposite the first hopper 111. Generally, Block S140 defines a dispense stroke in which the retaining plate of a corresponding topping module is retracted, thereby releasing a topping serving from the topping module. Block S130 can therefore rely on gravity (at least in part) to drop a topping serving from the topping module on the topping vehicle below. As described above, the processor can implement Block S140 by switching the corresponding selection actuator from the retaining plate 117 to the retaining plate and subsequently controlling the carriage actuator 134 to retract the selected retaining plate. As the retaining plate retracts in Block S140, the topper serving can be pushed off the retaining plate via a sidewall of a corresponding retaining guide, as described above, and thus drop onto an adjacent topping vehicle.

Block S150 of method S100 recites advancing the first retaining plate 115. Generally, Block S150 defines a reset stroke in which the retaining plate of is advanced back through the cutting chamber. Following Block S150, the retaining plate and the retaining plate 117 are thus substantially fully advanced, Block S160 can index the conveyor 120 forward to bring a subsequent topping vehicle adjacent the topping module, and Blocks S120, S130, and S140 can repeat, thereby releasing a topping serving from the topping module onto the subsequent topping vehicle. As described above, the processor can implement Block S150 by controlling the carriage actuator 134 to advance the retaining plate back into the cutting module.

Block S160 of method S100 recites indexing the first topping vehicle to the second position. Generally, Block S160 functions to index the conveyor 120 forward to place a topping vehicle in a subsequent topping position to receive a topping serving from a subsequent topping module, as described above. The processor can thus implement Block S160 by controlling the conveyor actuator to displace the topping vehicle forward into a subsequent topping module position. Method S100 can thus repeat Blocks S120, S130, S140, and S150—the topping serving dispense cycle—for the succeeding topping module to dispense a topping serving from the succeeding topping module onto the topping vehicle, such as based on a topping order corresponding to the topping vehicle.

As described above, cutting mechanisms of multiple topping modules can be actuated substantially simultaneously to dispense topping servings from multiple topping modules onto multiple topping vehicles substantially simultaneously. For example, Block S120 can include simultaneously retracting the first blade 116 and retracting a second blade 116b of the second topping module 110b, Block S130 can include simultaneously advancing the first blade 116 and advancing the second blade 116b through the second topping, Block S140 can include simultaneously retracting the first retaining plate 115 and retracting a second retaining plate 115b to dispense a topping slice from the second topping onto the second topping vehicle according to a second topping order for the second topping vehicle specifying the second topping type, and Block S150 can include simultaneously advancing the first retaining plate 115 and advancing the second retaining plate 115b, the second topping order specifying a combination of topping types different from the first topping order. Therefore, Blocks S120, S130, S140, and S150 can cooperate to dispense custom combinations of topping servings onto various topping vehicles according to corresponding topping orders.

Figure 5B:
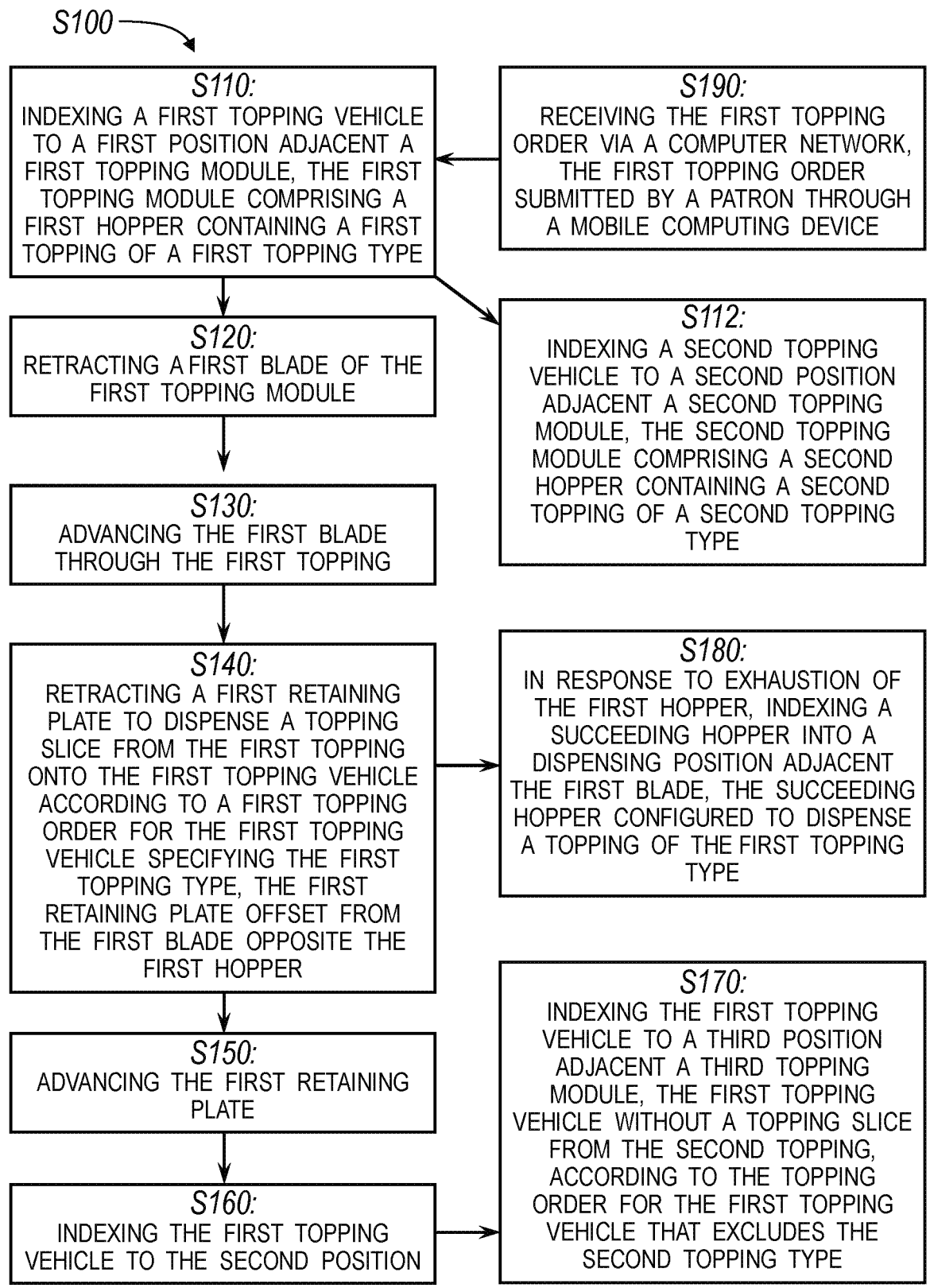
FIG. 5B is a flowchart representation of a variation of the method.

As shown in FIG. 5B, one variation of method S100 further includes Block S170, which recites indexing the first topping vehicle to a third position adjacent a third topping module, the first topping vehicle without a topping slice from the second topping, according to the topping order for the first topping vehicle that excludes the second topping type. Generally, Block S170 functions to implement a custom topping order corresponding to the first topping vehicle, wherein the custom topping order specifies no topping serving from the third topping module. As described above, method S100 can transport multiple topping vehicles through multiple adjacent topping modules simultaneously, and topping vehicles can thus be in various stages of build at any given time. Method S100 (e.g., implemented by the processor) can cycle the carriage 130 each time a subsequent topping vehicle enters a dispense position adjacent a topping module, and Block S170 can function to prevent loading of a topping serving from a particular topping module onto a particular topping vehicle if a corresponding topping order does not specify the corresponding topping type. For example, Block S170 can function to maintain a corresponding selection actuator in a retaining plate position such that the corresponding retaining plate is cycled (i.e., retracted and advanced) twice during a topping serving dispense cycle rather than cycling the retaining plate and the retaining plate 117 once each, which dispenses a topping serving. However, Block S170 can function in any other way to implement a topping order that excludes a particular topping type dispensed by a particular topping module.

As shown in FIG. 5B, one variation of method S100 includes Block S180, which recites, in response to exhaustion of the first hopper 111, indexing a succeeding hopper into a dispensing position adjacent the first blade 116, the succeeding hopper configured to dispense a topping of the first topping type. Generally, Block S180 functions to move a full hopper into position over a corresponding cutting mechanism of a topping module once topping samples within a preceding hopper are exhausted. For example, the processor can implement machine vision techniques to analyze an output of an optical sensor adjacent a topping module to detect a topping level of a hopper in a dispense position, and the processor can subsequently implement Block S180 to control the hopper magazine 170 to move a succeeding hopper into the dispense position in response to detection of an empty preceding hopper.

As shown in FIG. 5B, one variation of method S100 includes Block S190, which recites receiving the first topping order via a computer network, the first topping order submitted by a patron through a mobile computing device. Generally, Block S19 functions to receive a topping order and to assign the topping order to a particular topping vehicle. In one example, described above, the processor can implement Block S190 to receive a topping order entered into a native ordering application executing on a mobile computing device and submitted over a computer network (e.g., the Internet). In another example, the processor can implement Block S190 by receiving a topping order through a customer interface accessible through a web browser executing on an electronic device, such as a cellular phone, a smartphone, a tablet, or a desktop computer. In yet another example, the processor can implement Block S190 by receiving a topping order through a customer interface arranged on an automated foodstuff (e.g., hamburger) assembly system. However, Block S190 can function in any other way to receive a topping order though any other venue, network, and/or customer interface.

Systems, hoppers, cutting mechanisms, and methods of the embodiments can be embodied and/or implemented at least in part as a machine configured to receive a computer-readable medium storing computer-readable instructions. The instructions are can executed by computer-executable components can integrated with an application, applet, host, server, network, website, communication service, communication interface, hardware/firmware/software elements of a user computer or mobile device, or any suitable combination thereof. Other systems and methods of the embodiment can be embodied and/or implemented at least in part as a machine configured to receive a computer-readable medium storing computer-readable instructions. The instructions can be executed by computer-executable components can integrated by computer-executable components can integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

What is claimed is:

1. A system for dispensing toppings onto topping vehicles, comprising:
   a conveyor configured to move a topping vehicle between a first dispense position and a second dispense position;
   a first topping module comprising:
     a first blade arranged over the first dispense position;
     a first retaining plate arranged over the first dispense position and associated with the first blade; and
     a first hopper arranged over the first blade opposite the first retaining plate and configured to dispense toppings of a first topping type onto the first retaining plate;
   a second topping module adjacent the first topping module and comprising:
     a second blade arranged over the second dispense position;
     a second retaining plate arranged over the second dispense position and associated with the second blade; and
     a second hopper arranged over the second blade opposite the second retaining plate and configured to dispense toppings of a second topping type onto the second retaining plate, wherein the second topping type is distinct from the first topping type; and
   an actuation system configured to:
     move the first blade and the first retaining plate in a first direction and in a second direction relative to the first hopper to cut and dispense a topping sample of the first topping type onto the topping vehicle in the first dispense position, wherein the second direction is opposite the first direction, wherein the first blade and the first retaining plate move from a side with respect to the first hopper; and
     move the second blade and the second retaining plate in the first and second directions relative to the second hopper to cut and dispense a topping sample of the second topping type onto the topping vehicle in the second dispense position, wherein the second blade and the second retaining plate move from a side with respect to the second hopper.

2. The system of claim 1, wherein the first blade is mounted for reciprocating motion relative to the first retaining plate.

3. The system of claim 2, wherein the second blade is mounted for reciprocating motion relative to the second retaining plate.

4. The system of claim 3, wherein the first and second blades are configured to reciprocate relative to the first and second retaining plates in a third direction that is non-parallel to the first and second directions.

5. The system of claim 4, wherein the actuation system is configured to:
   move the first blade and the first retaining plate together in the first and second directions; and
   move the second blade and the second retaining plate together in the first and second directions.

6. The system of claim 1, wherein the actuation system comprises
   a first selection actuator configured to engage the first blade in a first position and to engage the first retaining plate in a second position;
   a first linear actuator configured to advance and retract the first selection actuator;
   a second selection actuator configured to engage the second blade in a first position and to engage the second retaining plate in a second position; and
   a second linear actuator configured to advance and retract the second selection actuator and operable independently of the first selection actuation.

7. The system of claim 1, wherein:
   the first blade is coupled to the first retaining plate and is vertically offset above at least a portion of the first retaining plate; and
   the second blade is coupled to the second retaining plate and is vertically offset above at least a portion of the second retaining plate.

8. The system of claim 7, wherein:
   the actuation system comprises a first linear actuator coupled to the first blade and a second linear actuator coupled to the second blade and
   the first linear actuator and the second linear actuator are independently actuatable during a dispense cycle based on food orders corresponding to topping vehicles arranged below the first topping module and the second topping module during the dispense cycle.

9. The system of claim 1, wherein the actuation system comprises:
   a beam extending across the first topping module and the second topping module;
   a first selection actuator supported by the beam adjacent the first topping module and configured to selectively couple the first blade to the beam during a dispense cycle in response to entry of a first topping vehicle into the first dispense position, wherein the first topping vehicle is associated with a first topping order specifying the first topping type;
   a second selection actuator supported by the beam adjacent the second topping module and configured to selectively decouple the second blade from the beam during the dispense cycle in response to entry of a second topping vehicle into the second dispense position, wherein the second topping vehicle is associated with a second topping order specifying exclusion of the second topping type; and
   a beam actuator configured to advance and retract the beam, relative to the first topping module and the second topping module, during the dispense cycle.

10. The system of claim 1, wherein the second blade comprises a cutting plate defining a blade receptacle configured to receive a razor blade.

11. The system of claim 10, wherein:
   the second blade comprises a first razor blade arranged in the blade receptacle in a first configuration and
   the second blade comprises a second razor blade arranged in the blade receptacle in a second configuration.

12. The system of claim 10, further comprising at least one processor configured to:
- correlate a current draw of an actuator, in the actuation system, advancing the cutting plate with a sharpness of the razor blade and
- trigger an alarm to replace the razor blade in response to the sharpness of the razor blade falling below a threshold blade sharpness.

13. The system of claim 1, further comprising a third topping module adjacent the second topping module, wherein:
- the third topping module comprises:
  - a third blade defining a grater region and arranged over a third dispense position and
  - a third hopper arranged over the third blade and configured to dispense toppings of a third topping type onto the third blade;
- the third topping type distinct from the first topping type and the second topping type; and
- the actuation system is further configured to move the third blade to dispense grated portions of a topping sample of the third topping type onto the topping vehicle in the third dispense position.

14. The system of claim 1, wherein:
- the first blade is vertically offset above at least a portion of the first retaining plate by a first distance and
- the second blade is vertically offset above at least a portion of the second retaining plate by a second distance different than the first distance.

15. The system of claim 1, wherein the first hopper comprises a stake extending from a top of the first hopper and toward the first blade, terminating above the first blade, and configured to pierce samples of the first topping type contained in the first hopper.

16. The system of claim 1, further comprising:
- a third topping module disposed vertically above the conveyor and configured to dispense topping samples of a third topping type onto the topping vehicle at a third dispense position; and
- a weighing scale configured to measure a weight of the topping samples of the third topping type dispensed from the third topping module.

17. The system of claim 16, wherein:
- the third topping module comprises:
  - a third hopper;
  - a cylinder disposed vertically below the third hopper and mounted for rotation relative to the third hopper; and
  - a third retaining plate disposed vertically below the cylinder;
- rotation of the cylinder dispenses the topping samples of the third topping type from the third hopper onto the third retaining plate; and
- the weighing scale is coupled with the third retaining plate.

18. The system of claim 17, further comprising a heating element arranged above the conveyor and configured to heat the topping vehicle on the conveyor.

19. The system of claim 18, further comprising a heat shield disposed between the heating element and the first hopper.

20. The system of claim 1, further comprising at least one processor controlling the actuation system and the conveyor, wherein the at least one processor is configured to, in response to a custom topping order that specifies presence of the first topping type and absence of the second topping type:
- start and stop operation of the conveyor to position the topping vehicle at the first dispense position to receive at least one topping sample of the second topping type and
- operate the conveyor to move the topping vehicle past the second dispense position to bypass the second dispense position without receiving any topping samples of the second topping type.

* * * * *